US011527068B2

(12) United States Patent
Cao et al.

(10) Patent No.: US 11,527,068 B2
(45) Date of Patent: Dec. 13, 2022

(54) METHODS AND SYSTEMS FOR VIDEO PROCESSING

(71) Applicant: ZHEJIANG DAHUA TECHNOLOGY CO., LTD., Zhejiang (CN)

(72) Inventors: Xinchao Cao, Hangzhou (CN); Jucai Lin, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/198,177

(22) Filed: Mar. 10, 2021

(65) Prior Publication Data
US 2021/0201040 A1    Jul. 1, 2021

Related U.S. Application Data

(60) Division of application No. 16/387,506, filed on Apr. 17, 2019, now Pat. No. 10,977,498, which is a (Continued)

(30) Foreign Application Priority Data

Oct. 18, 2016  (CN) .......................... 201610906960.3
Oct. 21, 2016  (CN) .......................... 201610917915.8

(51) Int. Cl.
*G06V 20/40* (2022.01)
*H04N 19/172* (2014.01)
(Continued)

(52) U.S. Cl.
CPC ........... *G06V 20/41* (2022.01); *H04N 19/114* (2014.11); *H04N 19/124* (2014.11);
(Continued)

(58) Field of Classification Search
CPC ...... G06V 20/41; G06V 20/44; H04N 19/114; H04N 19/124; H04N 19/132;
(Continued)

(56) References Cited

U.S. PATENT DOCUMENTS

2002/0147834 A1   10/2002   Liou et al.
2006/0168133 A1    7/2006   Park et al.
(Continued)

FOREIGN PATENT DOCUMENTS

CN    1468001 A    1/2004
CN    1909662 A    2/2007
(Continued)

OTHER PUBLICATIONS

International Search Report in PCT/CN2017/106484 dated Jan. 19, 2018, 4 Pages.
(Continued)

*Primary Examiner* — Nasim N Nirjhar
(74) *Attorney, Agent, or Firm* — Metis IP LLC

(57) ABSTRACT

A method for processing an online video stream may include determining a transmission performance of a network for a queue of video frames, wherein each video frame in the queue may be associated with a priority level. The method may also include determining a maximum discarding level based on the transmission performance of the network. The method may further include removing a target video frame of which the associated priority level is lower than or equal to the maximum discarding level from the queue.

14 Claims, 15 Drawing Sheets

Related U.S. Application Data continuation of application No. PCT/CN2017/106484, filed on Oct. 17, 2017.

(51) Int. Cl.

| | | |
|---|---|---|
| *H04N 21/2343* | (2011.01) | |
| *H04N 21/24* | (2011.01) | |
| *H04N 19/587* | (2014.01) | |
| *H04N 19/159* | (2014.01) | |
| *H04N 19/132* | (2014.01) | |
| *H04N 19/164* | (2014.01) | |
| *H04N 21/647* | (2011.01) | |
| *H04N 19/114* | (2014.01) | |
| *H04N 19/124* | (2014.01) | |
| *H04N 19/89* | (2014.01) | |

(52) U.S. Cl.
CPC ......... *H04N 19/132* (2014.11); *H04N 19/159* (2014.11); *H04N 19/164* (2014.11); *H04N 19/172* (2014.11); *H04N 19/587* (2014.11); *H04N 19/89* (2014.11); *H04N 21/234381* (2013.01); *H04N 21/2402* (2013.01); *H04N 21/64769* (2013.01); *G06V 20/44* (2022.01)

(58) Field of Classification Search
CPC .. H04N 19/159; H04N 19/164; H04N 19/172; H04N 19/587; H04N 19/89; H04N 21/234381; H04N 21/2402; H04N 21/64769

See application file for complete search history.

(56) References Cited

U.S. PATENT DOCUMENTS

| | | | |
|---|---|---|---|
| 2007/0071094 A1 | 3/2007 | Takeda et al. | |
| 2010/0124274 A1 | 5/2010 | Cheok et al. | |
| 2010/0150227 A1 | 6/2010 | Lee | |
| 2011/0051806 A1 | 3/2011 | Lee | |
| 2011/0292996 A1* | 12/2011 | Jayant | H04N 19/00 375/240.03 |
| 2014/0068680 A1 | 3/2014 | Stanwood et al. | |
| 2014/0072032 A1 | 3/2014 | Melnyk et al. | |
| 2014/0282776 A1 | 9/2014 | De Vriendt et al. | |
| 2014/0286620 A1 | 9/2014 | Ueda | |
| 2014/0334302 A1 | 11/2014 | Loach | |
| 2014/0376645 A1* | 12/2014 | Kumar | H04N 19/89 375/240.27 |
| 2015/0229960 A1 | 8/2015 | Yamasaki et al. | |
| 2015/0326857 A1* | 11/2015 | Zhang | H04N 19/65 375/240.03 |
| 2015/0373328 A1* | 12/2015 | Yenneti | H04N 19/31 375/240.03 |
| 2016/0029020 A1 | 1/2016 | Eymery et al. | |
| 2017/0078354 A1* | 3/2017 | Yang | H04N 21/8455 |

FOREIGN PATENT DOCUMENTS

| | | |
|---|---|---|
| CN | 101325711 A | 12/2008 |
| CN | 101656888 A | 2/2010 |
| CN | 101895759 A | 11/2010 |
| CN | 102378067 A | 3/2012 |
| CN | 103118241 A | 5/2013 |
| CN | 104159109 A | 11/2014 |
| CN | 104320669 A | 1/2015 |
| CN | 105376568 A | 3/2016 |
| CN | 105898358 A | 8/2016 |
| CN | 106454432 A | 2/2017 |
| CN | 106572352 A | 4/2017 |
| EP | 2432175 A1 | 3/2012 |
| WO | 02078274 A1 | 10/2002 |
| WO | 2005101846 A1 | 10/2005 |
| WO | 2009134176 A1 | 11/2009 |
| WO | 2014100973 A1 | 7/2014 |

OTHER PUBLICATIONS

Written Opinion in PCT/CN2017/106484 dated Jan. 19, 2018, 5 Pages.

The Extended European Search Report in European Application No. 17862412.8 dated Jun. 7, 2019, 8 pages.

First Office Action in Chinese Application No. 201610906960.3 dated Nov. 2, 2018, 13 pages.

The Second Office Action in Chinese Application No. 201610906960.3 dated Apr. 8, 2019, 12 pages.

Victorio Robles et al., Active Discarding Packet Mechanisms for Video Transmission, 2007 IEEE International Conference on System of Systems Engineering, 5 pages, 2007.

G. Seckin et al., Real-time Transmission of Multilayer Video over ATM Networks, Computer Communications, 23(10): 962-974, 2000.

* cited by examiner

1000

1010 — Determining a transmission performance of a network for a queue of video frames, each video frame in the queue associated with a priority level 1020 — Determining a maximum discarding level based on the transmission performance of the network 1030 — Removing, from the queue, a target video frame of which the associated priority level is lower than or equal to the maximum discarding level

┌─────────────────────────────────────────────┐
│ Determining a congestion level of a video frame │ ~ 1110
│ buffering queue upon determining that a current │
│ video frame is an independently decodable video │
│ frame                                           │
└─────────────────────────────────────────────┘

┌─────────────────────────────────────────────┐
│ Determining a maximum discarding level based on │ ~ 1120
│ the congestion level of the queue               │
└─────────────────────────────────────────────┘

┌─────────────────────────────────────────────┐
│ Discarding, from the video frame buffering queue, a │ ~ 1130
│ video frame of which an associated level is lower   │
│ than or equal to the maximum discarding level,      │
│ wherein the level of each video frame in the video  │
│ frame buffering queue is determined based at least  │
│ on a level associated with a specified event scene  │
│ included in that video frame                        │
└─────────────────────────────────────────────┘

FIG. 11

METHODS AND SYSTEMS FOR VIDEO PROCESSING

CROSS-REFERENCE TO RELATED APPLICATIONS

This application is a divisional application of U.S. application Ser. No. 16/387,506 filed on Apr. 17, 2019, which is a continuation of International Application No. PCT/CN2017/106484 filed on Oct. 17, 2017, which claims priority of Chinese Application No. 201610906960.3 filed on Oct. 18, 2016, and priority of Chinese Application No. 201610917915.8 filed on Oct. 21, 2016, the entire contents of each of which are hereby incorporated by reference.

TECHNICAL FIELD

The present disclosure generally relates to a method and apparatus for video processing and more specifically to a method and apparatus for processing video frames based on a transmission performance of a network for video transmission.

BACKGROUND

With the continuous development of network technology, the need for transmission of video contents (online video stream) through network for security monitoring as well as entertaining is dramatically increasing in the recent years. The network transmission of videos especially the real-time ones usually requires a huge amount of transmission time and excellent network transmission performance. However, there are many unstable factors, such as link congestion, electromagnetic interference, node failure, or the like, during the network transmission. These factors may greatly affect the transmission performance of the network and may cause a failure of video transmission or reduced video watching experience. Meanwhile, not all the video contents included in a video is of a user's interest. For example, in a surveillance video or in a live show, a large percent of scenes included in the video may be boring and useless. However, for watching the video, these undesired parts may also have to be transmitted, causing a waste of the transmission time and network resources. This kind of waste may greatly reduce the video watching experience especially when the transmission performance of the network is bad.

SUMMARY

According to an aspect of the present disclosure, a method for processing an online video stream may include determining a transmission performance of a network for a queue of video frames, wherein each video frame in the queue may be associated with a priority level. The method may also include determining a maximum discarding level based on the transmission performance of the network. The method may further include removing a target video frame of which the associated priority level is lower than or equal to the maximum discarding level from the queue.

In some embodiments, the priority level of each video frame in the queue may be determined based at least on an interest level associated with a specified event scene included in that video frame. The interest level may represent a degree of attention to the specified event scene.

In some embodiments, the transmission performance of the network may be indicated by a congestion level of the queue.

In some embodiments, the method may further comprise: obtaining a current video frame; upon determining that the current video frame is a dependently decodable video, obtaining another video frame, wherein the another video frame and the current video frame belong to a same group of picture and the priority level that is associated with the another video frame is lower than the priority level of the current video frame; changing the priority level that is associated with the another video frame to the priority level of the current video frame; and adding the current video frame into the queue.

In some embodiments, the determining of the transmission performance of the network may include: obtaining a current video frame; and upon determining that the current video frame is an independently decodable video frame, determining the transmission performance of the network.

In some embodiments, the method may further comprise determining an initial level of the current video frame.

In some embodiments, the method may further comprise, after the removing of the target video frames: adding the current video frame into the queue; and labeling the priority level of the current video frame as the initial level of the current video frame.

In some embodiments, the determining of the initial level of the current video frame may include: determining whether the current video frame includes any specified event scene; upon determining that the current video frame includes at least one specified event scene, determining an interest level for each specified event scene of the at least one specified event scene; and designating a highest interest level of the at least one specified event scene as the initial level of the current video frame.

In some embodiments, the obtaining of the current video frame may include: encoding a candidate video frame based on an estimated encoded size of the candidate video frame; and designating the encoded candidate video frame as the current video frame.

In some embodiments, the encoding of the candidate video frame may include estimating a complexity of the candidate video frame; obtaining a first quantization parameter for performing the encoding; estimating whether a first encoded size of the candidate video frame exceeds a predetermined threshold based on the complexity of the candidate video frame and the first quantization parameter; when the first encoded size exceeds the predetermined threshold, determining a second quantization parameter, so that a second encoded size of the candidate video frame based on the second quantization parameter is lower than or equal to the predetermined threshold; and encoding the candidate video frame based on the second quantization parameter. Wherein the encoded size of the candidate video frame may be the first encoded size or the second encoded size.

In some embodiments, the candidate video frame may be encoded as an independently decodable video frame.

According to another aspect of the present disclosure, a video processing system for processing an online video stream may include at least one processor and at least one storage device storing instructions. When executing the instructions, the at least one processor may be configured to determine a transmission performance of a network for a queue of video frames, each video frame in the queue associated with a priority level. The at least one processor may also be configured to determine a maximum discarding level based on the transmission performance of the network. The at least one processor may further be configured to remove a target video frame of which the associated priority level is lower than or equal to the maximum discarding level from the queue.

According to another aspect of the present disclosure, a video processing system for processing an online video stream may comprise a first determination module, a second determination module, and a processing module. The first determination module may be configured to determine a transmission performance of a network for a queue of video frames, wherein each video frame in the queue may be associated with a priority level. The second determination module may be configured to determine a maximum discarding level based on the transmission performance of the network. The processing module may be configured to remove a target video frame of which the associated priority level is lower than or equal to the maximum discarding level.

According to another aspect of the present disclosure, a non-transitory computer readable medium may embody a computer program product including instructions configured to cause a computing device to perform a method. The method may include determining a transmission performance of a network for a queue of video frames, wherein each video frame in the queue may be associated with a priority level. The method may also include determining a maximum discarding level based on the transmission performance of the network. The method may further include removing a target video frame of which the associated priority level is lower than or equal to the maximum discarding level from the queue.

According to another aspect of the present disclosure, a method for encoding video streams via at least one video processing device may include determining a complexity of a candidate video frame. The method may also include obtaining a first quantization parameter for performing the encoding. The method may further include determining whether a first encoded size of the candidate video frame exceeds a predetermined threshold based on the complexity of the candidate video frame and the first quantization parameter. When the first encoded size exceeds the predetermined threshold, the method may further include determining a second quantization parameter, so that a second encoded size of the candidate video frame based on the second quantization parameter is lower than or equal to the predetermined threshold. The method may also include encoding the candidate video frame based on the second quantization parameter.

In some embodiments, the complexity of the candidate video frame may include a sum of absolute differences (SAD) of the candidate video frame. The complexity of the candidate video frame may be estimated based on an SAD of at least one preceding video frames.

In some embodiments, the method may further comprise encoding the candidate video frame based on the first quantization parameter when the first encoded size is lower than or equal to the predetermined threshold.

In some embodiments, the predetermined threshold may be determined based on a network transmission rate and a maximum network transmission wait time.

In some embodiments, the candidate video frame may be encoded as an independently decodable video frame.

In some embodiments, the method may further comprise: designating the encoded candidate video frame as a current video frame; determining a transmission performance of a network for a queue of video frames, each video frame in the queue associated with a priority level; determining a maximum discarding level based on the transmission performance of the network; and removing target video frames of which the associated priority level is lower than or equal to the maximum discarding level from the queue.

In some embodiments, the priority level of each video frame in the queue is based at least on an interest level associated with a specified event scene included in that video frame. The interest level may represent a degree of attention to the specified event scene.

According to another aspect of the present disclosure, a video processing system for encoding video streams may include at least one processor and at least one storage device storing instructions. When executing the instructions, the at least one processor may cause the system to determine a complexity of a candidate video frame and obtain a first quantization parameter for performing the encoding. The system may also be caused to determine whether a first encoded size of the candidate video frame exceeds a predetermined threshold based on the complexity of the candidate video frame and the first quantization parameter. When the first encoded size exceeds the predetermined threshold, the system may be further caused to determine a second quantization parameter, so that a second encoded size of the candidate video frame based on the second quantization parameter is lower than or equal to the predetermined threshold. The system may also be caused to encode the candidate video frame based on the second quantization parameter.

According to another aspect of the present disclosure, a video processing system for encoding video streams may comprise a first estimation module, an acquisition, a second estimation module, a determination module, and an encoding module. The first estimation module may be configured to determine a complexity of a candidate video frame. The acquisition module may be configured to obtain a first quantization parameter for performing the encoding. The second estimation module may be configured to determine whether a first encoded size of the candidate video frame exceeds a predetermined threshold based on the complexity of the candidate video frame and the first quantization parameter. The determination module may be configured to determine a second quantization parameter when the first encoded size exceeds the predetermined threshold, so that a second encoded size of the candidate video frame based on the second quantization parameter is lower than or equal to the predetermined threshold. The encoding module may be configured to encode the candidate video frame based on the second quantization parameter.

According to yet another aspect of the present disclosure, a non-transitory computer readable medium may embody a computer program product including instructions configured to cause a computing device to perform a method. The method may include determining a complexity of a candidate video frame. The method may also include obtaining a first quantization parameter for performing the encoding. The method may further include determining whether a first encoded size of the candidate video frame exceeds a predetermined threshold based on the complexity of the candidate video frame and the first quantization parameter. When the first encoded size exceeds the predetermined threshold, the method may further include determining a second quantization parameter, so that a second encoded size of the candidate video frame based on the second quantization parameter is lower than or equal to the predetermined threshold. The method may also include encoding the candidate video frame based on the second quantization parameter.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTIONS OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 10 and 11 are schematic diagrams illustrating exemplary processes for processing video frames according to some embodiments of the present disclosure;

DETAILED DESCRIPTION

Figure 1:
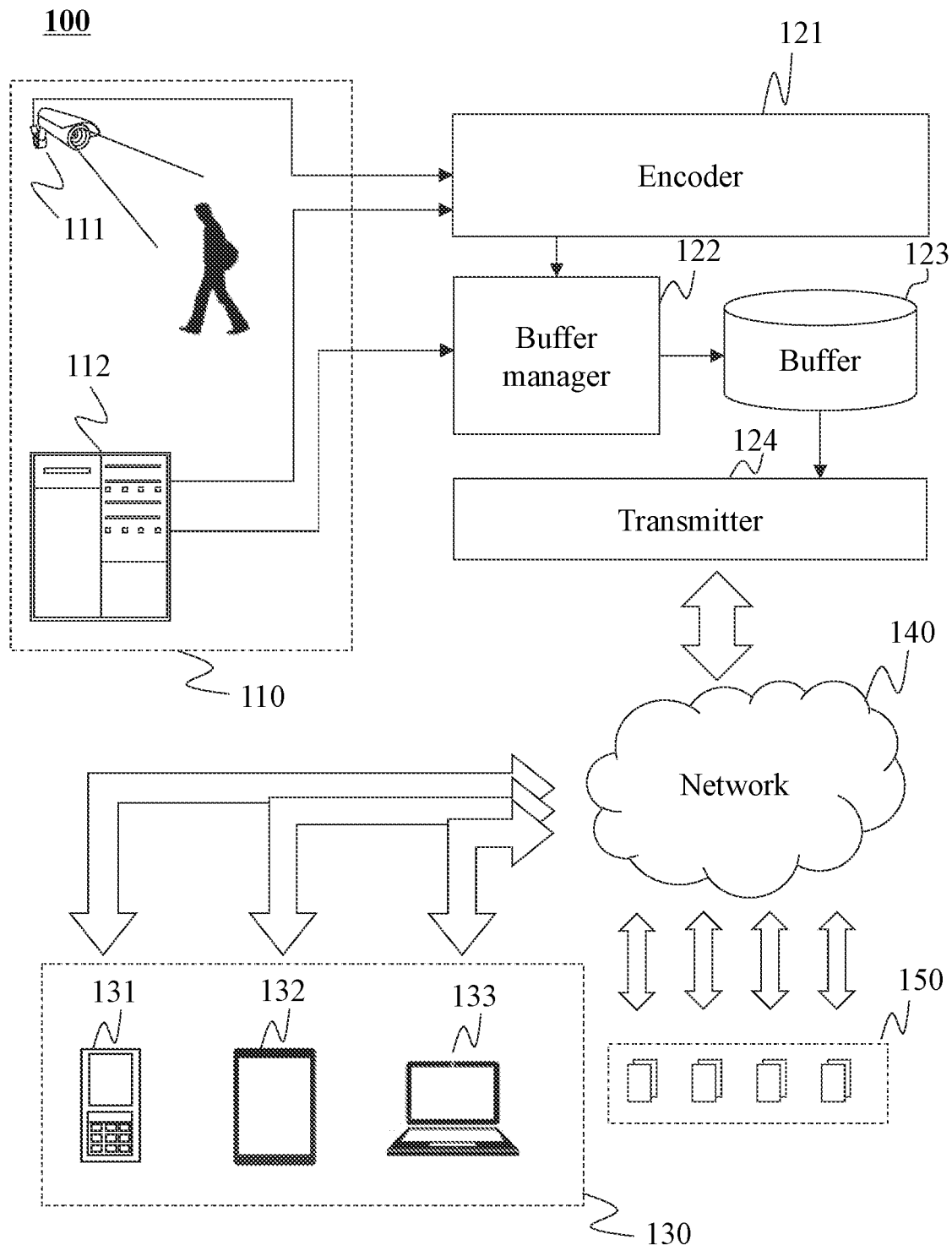
FIG. 1 is a schematic diagram illustrating an exemplary video processing system 100 according to some embodiments of the present disclosure.

The present disclosure is directed to a system and method for processing video frames based on a transmission performance of a network for video transmission. The transmission performance of the network may be used to determine a frame discarding (or removing) manner and/or a frame encoding manner. The content of the video frames may also be taken into consideration during the encoding of the video. The size of the encoded video may be greatly reduced as a result.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a", "an", and "the" may be intended to include the plural forms as well, unless the context clearly indicates otherwise. It will be further understood that the terms "comprise", "comprises", and/or "comprising", "include", "includes", and/or "including", when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

Generally, the word "module," "sub-module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts.

Figure 2:
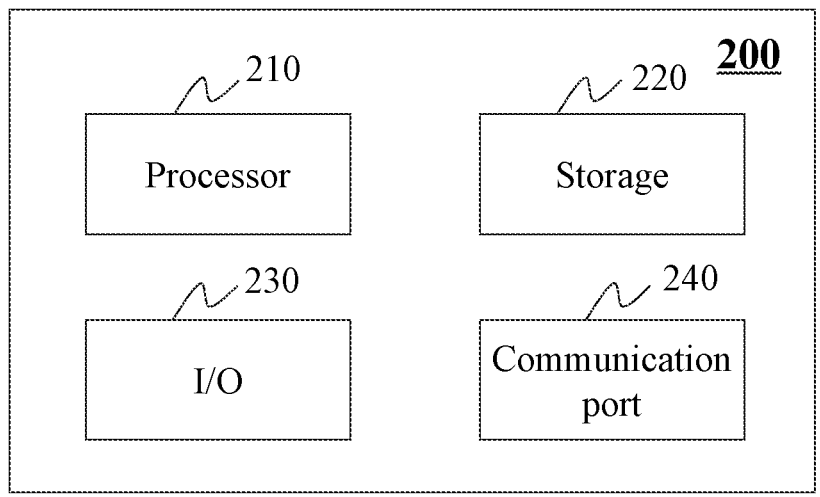
FIG. 2 is a schematic diagram illustrating exemplary components of an exemplary computing device according to some embodiments of the present disclosure.

Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

FIG. 1 is a schematic diagram illustrating an exemplary video processing system 100 according to some embodiments of the present disclosure. As shown, the video processing system 100 may include a video source 110, an encoder 121, a buffer manager 122, a buffer 123, a transmitter 124, a terminal 130 (or a plurality of terminals 130), network 140, and a network storage device 150 (or a plurality of network storages 150).

The video source 110 may provide a video (e.g., on line video stream) through the network 140 to a user of a terminal 130. The video source 110 may generate a video itself or a video transfer site. The video source 110 may include a camera 111 and/or a media server 112. The media sever may be a server (e.g., a computer or a group of computers) for storing, broadcasting, selling, renting, or providing videos.

A "video" provided by the video source 110 may be an electronic medium (e.g., a data file, a bit stream, a series of signal) for the recording, copying, playback, broadcasting, and display of moving visual media, such as a TV program, an animation, a movie, a surveillance or monitoring video, a video shared through a social platform, an advertisement, a live show, a video call, a video conference, or the like, or a combination thereof. A video may include a plurality of frames, which may also be referred to as video frames. A frame may be one of a plurality of still images that compose a completer video. By sequentially displaying frames of a video in a rate (frame rate), a video player installed on the terminal 130 may present the video to a user. In the present disclosure, the term "frame" may also refer to an electronic medium for holding a frame of a video, such as a data piece, a section of a bit stream, a piece of signal, etc.

Before transmitting a video through the network 140, the video source 110 may send the video to the encoder 121 for encoding the video, or send the video to the buffer 123 through the buffer manager 122. For example, the video provided by the video source 110 may be relatively large in size (e.g., raw video data, video encoded with low compression rate), thus before the transmission the video source 110 may send the video to the encoder 121 for video compression. As another example, the video provided by the video source 110 may be proper in size, and the video source 110 may directly send the video to the buffer 123 through the buffer manager 122 for video transmission.

An encoder 121 may encode the video provided by the video source 110 before the video is transmitted through the network 140. Through encoding, the video to be transmitted may be compressed and/or encrypted. For example, the encoder 121 may encode a video using an algorithm for video compression so that the cost (e.g., time cost, resource cost, financial cost) for transmitting the video may be significantly reduced. Alternatively or additionally, the encoder 121 may encode a video using an algorithm for video encryption so that the video may be transmitted safely and a user without permission may not watch the video. The encoder 121 may encode the video frame by frame and generate a plurality of encoded video frames. The encoder 121 may send the encoded video frame to the buffer 123 through the buffer manager 122. Alternatively or additionally, the buffer manager 122 may obtain the encoded video frame from the encoder 121.

In some embodiments, the encoder 121 may encode the video to be transmitted using a Moving Picture Experts Group (MPEG) based encoding technique. For example, the encoder 121 may encode video frames of the video to be transmitted into a plurality of independently decodable video frames (may also be referred to as key frames, intra-frames (I-frames), etc.) and a plurality of dependently decodable video frames (may also be referred to as inter-frames, such as predicted frames (P-frames) and bidirectional predicted frame (B-frame)). A brief description of the MPEG based encoding technique is provided elsewhere in the present disclosure (e.g., in connection with FIG. 12).

In some embodiments, the encoder 121 may encode at least some of the video frames based on an estimated (or determined) encoded size of them. For example, the encoder 121 may use different parameters for encoding video frames with different estimated sizes.

In some embodiments, the encoder 121 may encode at least some of the video frames based on the transmission performance of the network 140. For example, the encoder 121 may control the size of the encoded video frames based on the transmission performance of the network 140. The transmission performance of the network 140 may be measured by a transmission rate of the network 140 (e.g., measure by a data transmission rate and/or a video frame loading rate of the transmitter 124), a congestion degree of the network 140 (e.g., measured by the response time of the network 140), a condition of the buffer 123 (e.g., measured by the memory usage of the buffer 123), or the like, or a combination thereof. A better transmission performance may result in a larger encoded video frame.

The buffer manager 122 may manage the buffer 123. The buffer 123 may use a queue based data structure for storing or buffering the video to be transmitted. The queue based data structure may be referred to as a video frame buffering queue, a video buffering queue, a buffering queue, a frame buffering queue, or simply a queue. The buffer manager 122 may manage the buffer 123 by processing one or more queues held by the buffer 123. For example, the buffer manager 122 may have one or more of the following functions: adding video frames received or obtained from the encoder 121 or the media server 112 into a queue, discarding (or removing) one or more video frames in a queue, sending video frames in the queue to the transmitter 124, etc.

In some embodiments, the buffer manager 122 may process the one or more queues included in the buffer 123 based on the transmission performance of the network 140. The buffer manager 122 may determine the transmission performance of the network 140 based on the status of one or more queues held by the buffer 123 (e.g., a memory usage of the buffer 123). Alternatively or additionally, the buffer manager 122 may determine the transmission performance of the network 140 through the transmitter 124.

Detailed description of a queue as well as the management of the queue are provided elsewhere (e.g., in connection with FIGS. 5, 6, and 7) in the present disclosure.

In some embodiments, the buffer manager 122 may determine a level (may also be referred to as priority level or discardable level) for the at least one video frame received or obtained from the encoder 121 or the media server 112. The level determination may also be viewed as classification. The buffer manager 122 may determine the level based on video content included in the video frame. For example, the buffer manager 122 may determine whether the video frame include any specified event scene, then label or designate the level of (or associated with) the video frame based on the level (e.g., interest level) of the specified event scene included in that video frame (level 0 may be assigned to a video frame includes no specified event scene). The level of the specified event scene may be obtained using a look-up table or pre-set by a user. The level of the specified event scene may represent a degree of attention to the specified event scene.

In some embodiments, the buffer manager 122 may also change levels of video frames already buffered in the buffer 123 (e.g., based on the level of a video frame to be added into the buffer 123).

In some embodiments, instead of the buffer manager 122, the encoder 121 may determine the level of a video frame during the encoding of the video frame. The encoder 121 may label or designate the determined level to the video frame then send the video frame to the buffer 123 through the buffer manager 122.

The buffer 123 may include at least one storage device for storing or buffering the video to be transmitted through the network 140. As mentioned earlier, the video or video frames to be transmitted may be stored in the buffer 123 in a form of a queue, which may be managed by the buffer manager 122. The buffer 123 may include one or more queues at a same time. Video frames of a same video may be stored in one or more queues. Video frames of different videos may be stored in a same queue or different queues. The buffer 123 may only buffer a single video or a part of a video (e.g., stream media, surveillance video) at one time. Alternatively, the buffer 123 may buffer a plurality of videos to be transmitted to one or more terminals 130 at a same time.

The buffer 123 may include a mass storage device, a removable storage device, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM), such as a dynamic RAM (DRAM), a double date rate synchronous dynamic RAM (DDR SDRAM), a static RAM (SRAM), a thyristor RAM (T-RAM), and a zero-capacitor RAM (Z-RAM). Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc.

The transmitter 124 may transmit the video or video frames stored or buffered in the buffer 123 to the network 140. The transmitter 124 may transmit video or video frames in response to instructions sent from the video provider 110, the buffer manager 122, the terminal 130, or the like, or a combination thereof. Alternatively or additionally, the transmitter 124 may spontaneously transmit video or video frames stored in the buffer 123. The transmitter 124 may transmit video or video frames through the network 140 to the terminal 130 though one or more network connections (wired and/or wireless).

In some embodiments, the transmitter 124 may be capable of determine the transmission performance of the network 140. For example, the transmitter 124 may monitor its data transmitted rate for determining the transmission performance.

The terminal 130 may receive the transmitted video through the network 140. The terminal 130 may decode (e.g., through a video player installed on the terminal 130) the transmitted video or video frames using a decoding algorithm and display the video to a user. The decoding algorithm may correspond to the encoding algorithm used by the encoder 121.

In some embodiments, the terminal 130 may use a network transmission wait time for receiving a frame. If a complete frame of a video has not been received during or over this time, the situation may be treated as a network transmission anomaly, such as data loss. This kind of failure of frame transmission may be caused by a bad transmission performance of the network 140 and/or an over-sized video frame encoded by the encoder 121. To avoid this kind of situation, the encoder 121 may control sizes of the encoded video frames (e.g., I-frames) based on a maximum network transmission wait time and the transmission performance of the network 140 (e.g., measured by a transmission rate of the network 140). For example, the encoder 121 may directly obtain the maximum network transmission wait time from the terminal 130 (e.g., in a request for video transmission) or estimate (or determine) it based on the transmission failure response sent by the terminal 130. The encoder 121 may determine the network transmission rate itself or obtain it from the buffer manager 122 or transmitter 124.

The terminal 130 may be various in forms. For example, the terminal 130 may include a mobile device 131, a tablet computer 132, a laptop computer 133, or the like, or any combination thereof. In some embodiments, the mobile device 131 may include, a wearable device, a mobile device, a virtual reality device, an augmented reality device, or the like, or any combination thereof. In some embodiments, the wearable device may include a bracelet, footgear, eyeglasses, a helmet, a watch, clothing, a backpack, a smart accessory, or the like, or any combination thereof. In some embodiments, the mobile device may include a mobile phone, a personal digital assistance (PDA), a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal(s) 130 may be part of the processing engine 140.

The network 140 may include any suitable network that can facilitate a transmission of a video provided by the video source 110 to the terminal(s) 130. The network 140 may be and/or include a public network (e.g., the Internet), a private network (e.g., a local area network (LAN), a wide area network (WAN)), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 140 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 140 may include one or more network access points. For example, the network 140 may include wired and/or wireless network access points such as base stations and/or internet exchange points through which a video provided by the video source 110 may be transmitted to the terminal 130.

In some embodiments, the network 140 may include one or more network storage devices 150. The network storage device 150 may be a device for buffering or caching data transmitted in the network 140. The video or video frame transmitted by the transmitter 124 may be buffered or cashed in one or more network storage devices 150 before being received by the terminal 130. The network storage device 150 may be a server, a hub, a gateway, or the like, or a combination thereof.

It may be noted that, one or more of the encoder 121, buffer manager 122, buffer 123 and transmitter may be a stand-alone device, or a module integrated into another stand-alone device. For example, one or more of the encoder 121, buffer manager 122, buffer 123 and transmitter 124 may be integrated into the camera 111 or the media server 112. As another example, the encoder 121, buffer manager 122, buffer 123 and transmitter 124 may be included in one or more video processing devices which may communicate with the network 140 and receive and process the queue of video frames. The one or more video processing devices may communicate with the video source 110 through direct wired connection, the network 140, or another network not shown in FIG. 1. As a further example, the encoder 121 may be a stand-alone device (e.g., a computer or a server), while the buffer manager 122, buffer 123 and transmitter 124 may be included in another stand-alone device.

One of ordinary skill in the art would understand that when an electronic device (e.g., the encoder 121, the buffer manager 122, the transmitter 124) in the video processing system 100 performs, the electronic device may perform through electronic signals and/or electromagnetic signals. For example, when the encoder 121 processing device processes a task, such as encoding an image or a video from the camera 111, it may operate logic circuits in its processor to perform such task. For example, when a processor of the electronic device retrieves or saves data from a storage medium, it may transmit out electronic signals to a read/write device of the storage medium, which may read or write structured data in the storage medium. The structured data may be transmitted to the processor in the form of electronic signals via a bus of the electronic device. Here, an electrical signal may refer to one electrical signal, a series of electronic signals, and/or a plurality of discrete electrical signals. Similarly, when an electronic device communicate to another device, such as when the camera 111 sends out an image or a video and when the media server 112 sends out an instruction, etc., it may generate electronic signals carrying the communication and sends out the electronic signals through an output port thereof.

FIG. 2 is a schematic diagram illustrating exemplary components of an exemplary computing device according to some embodiments of the present disclosure. For example, the computing device may be an electronic device specialized in video or image processing. The encoder 121 and buffer manager 122 may be implemented on computing device 200. As illustrated in FIG. 2, the computing device 200 may include a processor 210, storage 220, an input/output (I/O) 230, and a communication port 240.

The processor 210 may execute computer instructions (e.g., program code) and perform functions of the encoder 121 and the buffer manager 122 in accordance with techniques described herein. The computer instructions may include, for example, routines, programs, objects, components, data structures, procedures, modules, and functions, which perform particular functions described herein. For example, the processor 210 may be configured to encode a video frame, add the video frame into a queue, and processing the queue.

In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus steps and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two or more different processors jointly or separately in the computing device 200 (e.g., a first processor executes step A and a second processor executes step B, or the first and second processors jointly execute steps A and B).

The storage 220 may store data/information obtained from the video source 110, the encoder 121, the buffer manager 122, the buffer 123, the transmitter 124, the terminal 130, the network 140, the network storage device 150, and/or any other component of the video processing system 100. In some embodiments, the storage 220 may include a mass storage, removable storage, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random-access memory (RAM), which may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing engine 140 for determining a regularization item.

The I/O 230 may input and/or output signals, data, information, etc. In some embodiments, the I/O 230 may enable a user interaction with the processing engine 140. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 140) to facilitate data communications. The communication port 240 may establish connections between the video source 110, the encoder 121, the buffer manager 122, the buffer 123, the transmitter 124, the terminal 130, the network 140, the network storage device 150, and/or any other component of the video processing system 100. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
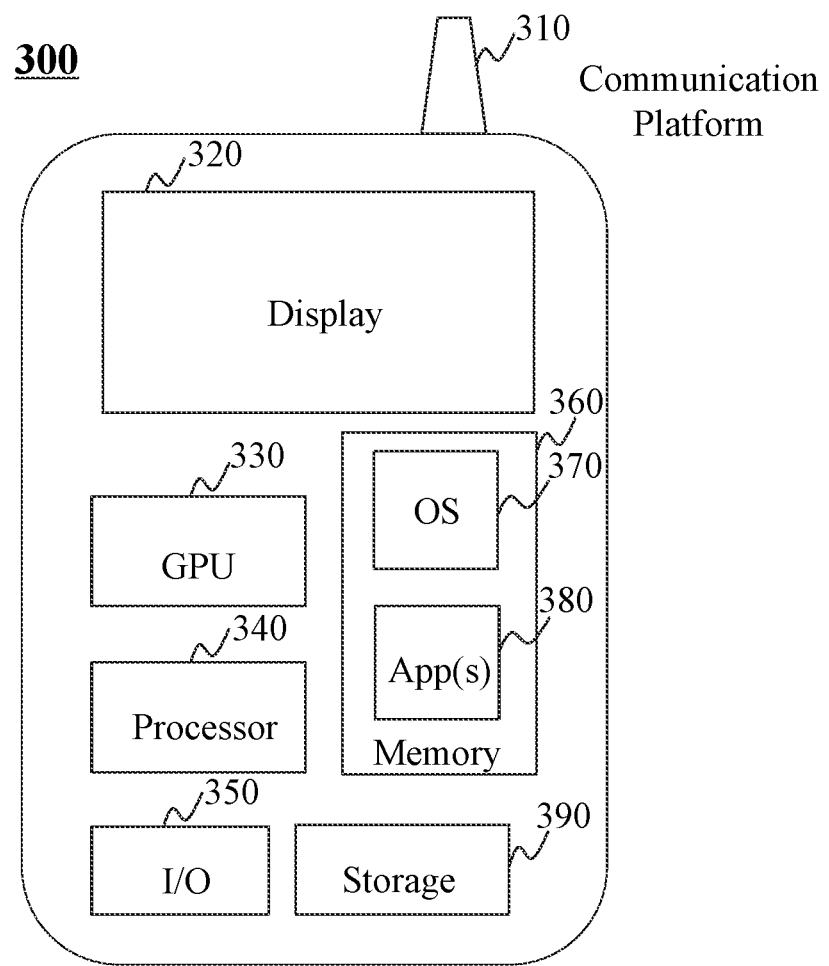
FIG. 3 is a schematic diagram illustrating exemplary components of an exemplary mobile device according to some embodiments of the present disclosure.

FIG. 3 is a schematic diagram illustrating exemplary components of an exemplary mobile device according to some embodiments of the present disclosure. As illustrated in FIG. 3, the mobile device 300 may include a communication platform 310, a display 320, a graphic processing unit (GPU) 330, a processor 340, an I/O port 350, a memory 360, and storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the processor 340. The mobile device 300 may be an embodiment of the terminal 130. The applications 380 may include a video player for receiving a video provided by the video source 110 through the network 140 and decode the received video.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
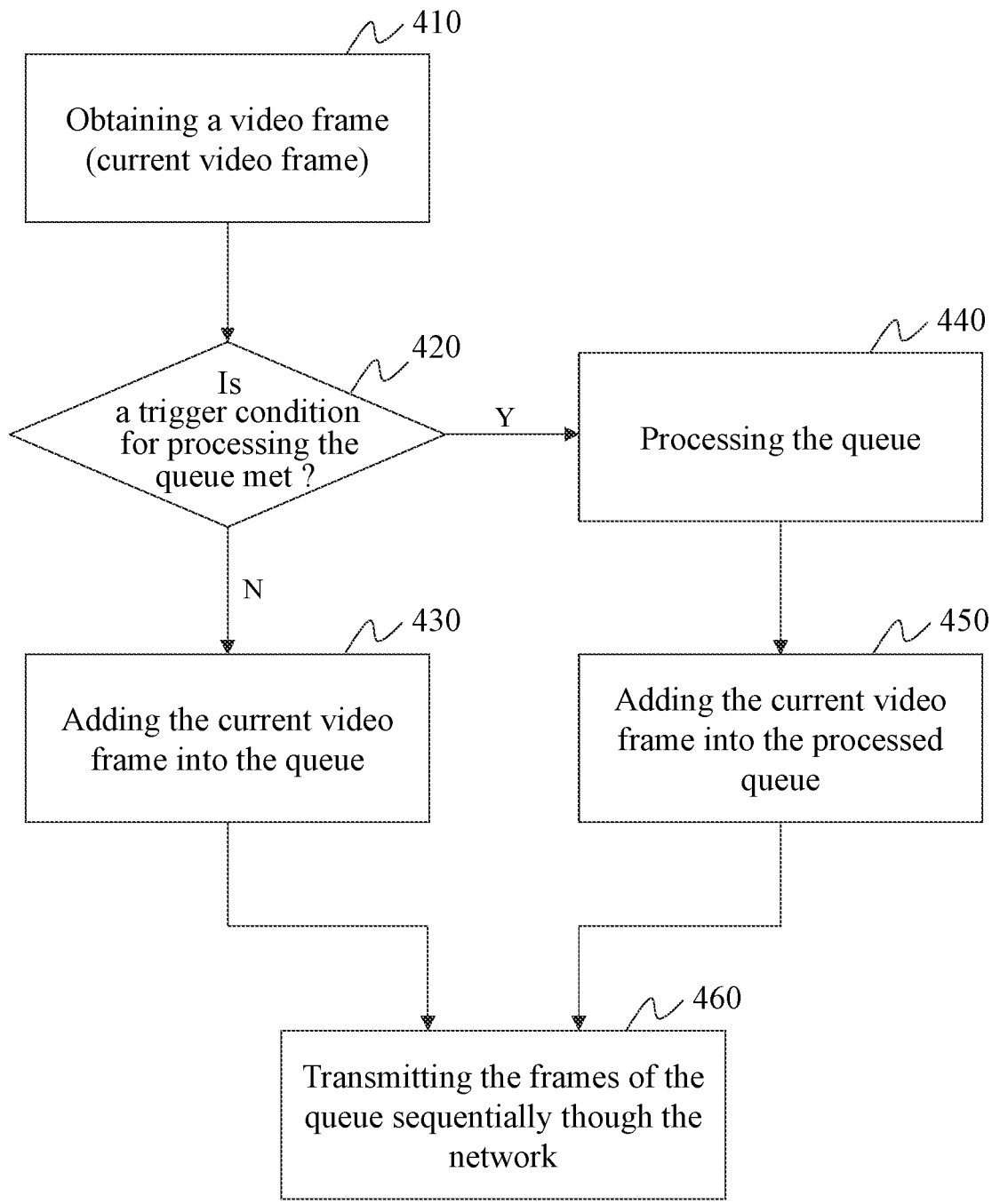
FIG. 4 is a schematic diagram illustrating an exemplary processing of a queue stored in a buffer unit according to some embodiments of the present disclosure.

FIG. 4 is a schematic diagram illustrating an exemplary processing of a queue stored in a buffer unit according to some embodiments of the present disclosure. Process 400 may be performed by the components of video processing system 100 to process and transmit a video or its video frames. In some embodiments, one or more operations of process 400 may be performed by the computing device 200 (illustrated in FIG. 2) implementing related functions of the components (e.g., the encoder 121, the buffer manager 122, and the transmitter 124) of video processing system 100. For example, process 1000 may be stored in the storage 220 in the form of instructions, and invoked and/or executed by the processor 210.

Process 400 may be performed in cycles. During each cycle, a video frame may be added into a queue. Video frames in the queue may be transmitted through the network 140 constantly. The frequency of adding a video frame may be different from the frequency of transmitting a video frame. The former one may be affected by the execution speed of process 400, while the latter one may be affected by the transmission performance of the network 140.

In step 410, the buffer manager 122 may obtain a video frame. The video frame may be obtained from the encoder 121 (with an encoding process) or the video source 110 (without an encoding process). The obtained video frame may be referred to as a current video frame in the following steps of a same cycle.

In some embodiments, the video frame may be an encoded video frame generated by the encoder 121. The encoder 121 may obtain a video or a piece of video from the video source 110 and encode the video or the piece of video frame by frame. The encoder 121 may encode a video frame using an intra-frame encoding technique (e.g., iFrame, motion JPEG-2000) or an inter-frame encoding technique (e.g., MPEG). The encoded video frame may be an independently decodable video frame (e.g., I-frame) or a dependently decodable video frame (e.g., P-frame).

In some embodiments, the encoder 121 may encode at least some of the video frames based on an estimated (or determined) encoded sized of them. The at least some of the video frames may be encoded solely as I-frames, or be encoded as any type of frames (I-frame, P-frame or B-frame). The encoder 121 may use different parameters for encoding the at least some of the video frames with different estimated sizes so that the final size of the encoded video frames may be controlled. The encoder 121 may encode the at least some of the video frames further based on the transmission performance of the network 140.

The encoder 121 may estimate (or determine) an encoded size of a video frame based on a complexity of the video frame. A complexity of a video frame may indicate a spatial redundancy (e.g., correlation among pixels within one frame) of the video frame or a degree of difference between the video frame and a reference video frame (e.g., a preceding video frame). For example, the complexity of a video frame may include or be measured by a sum of absolute differences (SAD) of the video frame. The encoder 121 may use various techniques well known in the art to estimate the complexity of the video frame.

An exemplary encoding process is described in connection with FIG. 20, which is provided for illustration purposes and not intended to be limiting.

In some embodiments, the encoder 121 may determine a level (priority level) for the encoded video frame and label or designate the determined level to the encoded video frame. The encoder 121 may determine the level based on, for example, the video content included in the video frame.

In step 420, the buffer manager 122 may determine whether a trigger condition for processing the queue is met. Upon determining the trigger condition is met, step 440 may then be performed; otherwise, step 430 may then be performed.

The trigger condition the processing of the queue may be various. Exemplary trigger conditions may include: the current video frame is an independently decodable video frame, the transmission performance of the network 140 is below a certain standard, a certain time interval has been passed, a certain time point is reached, a certain number of video frames have been added into the queue, a percentage of usage of the buffer 123 exceed a predetermined threshold, any one of the components of the video processing system is over-loaded, a trigger signal (e.g., sent by a user through the terminal 130) is received, or the like, or a combination thereof.

In step 430, the buffer manager 122 may add the current video frame into the queue without processing the queue. However, in some embodiments, the buffer manager 122 may add certain information to the current video frame. For example, the buffer manager 122 may determine a level (e.g., an initial priority level) of the current video frame and label or designate the determined level to the current video frame (e.g., when the encoder 121 doesn't add levels to the video frames or the video to be transmitted is not encoded by the encoder 121), then add the current video frame into the queue.

In step 440, the buffer manager 122 may process the queue. For example, the buffer manager 122 may discard (or remove) one or more video frames in the queue, clear the whole queue, send one or more video frames in the queue back to the encoder 121 for re-encoding them, re-arrange the queue, add information to one or more video frames, change information of one or more video frames, or the like, or a combination thereof.

In some embodiments, the buffer manager 122 may discard one or more video frames in the queue in response to a reduced transmission performance of the network 140. The discarded video frames may be of lower importance or of lower levels (priority levels) compared to the residual video frames in the queue.

In some embodiments, the buffer manager 122 may determine a level (e.g., an initial priority level) of the current video frame and label or designate the determined level to the current video frame (e.g., when the encoder 121 doesn't add levels to the video frames or the video to be transmitted is not encoded by the encoder 121).

In some embodiments, the buffer manager 122 may process the queue based at least on the level of the current video frame. For example, the buffer manager 122 may change the levels of one or more preceding video frames based on the level of the current video frame.

Exemplary processes for implementing step 430 are described in connection with FIGS. 10, 11, and 18, which are provided for illustration purposes and not intended to be limiting.

In step 450, the buffer manager 122 may add the current video frame into the processed queue. According to some embodiments, the buffer manager 122 may add additional information to the current video frame.

In step 460, the transmitter 124 may transmit the frames of the queue sequentially though the network 140. The transmitter 124 may spontaneously transmit video or video frames stored in the buffer 123. Alternatively, or additionally, the transmitter 124 may transmit video or video frames in response to instructions sent from the buffer manager 122. Step 460 may be performed independently of other steps of process 400, that is, step 460 may be performed before, after, or during any other steps of process 400.

It may be noted that the above descriptions of video frame processing are only for demonstration purposes, and not intended to limit the scope of the present disclosure. It is understandable that, after learning the major concept and the mechanism of the present disclosure, a person of ordinary skill in the art may alter process 400 in an uncreative manner. For example, the operations above may be implemented in an order different from that illustrated in FIG. 4. One or more optional operations may be added to the flowcharts. One or more operations may be divided or be combined. All such modifications are within the protection scope of the present disclosure.

Figure 5:
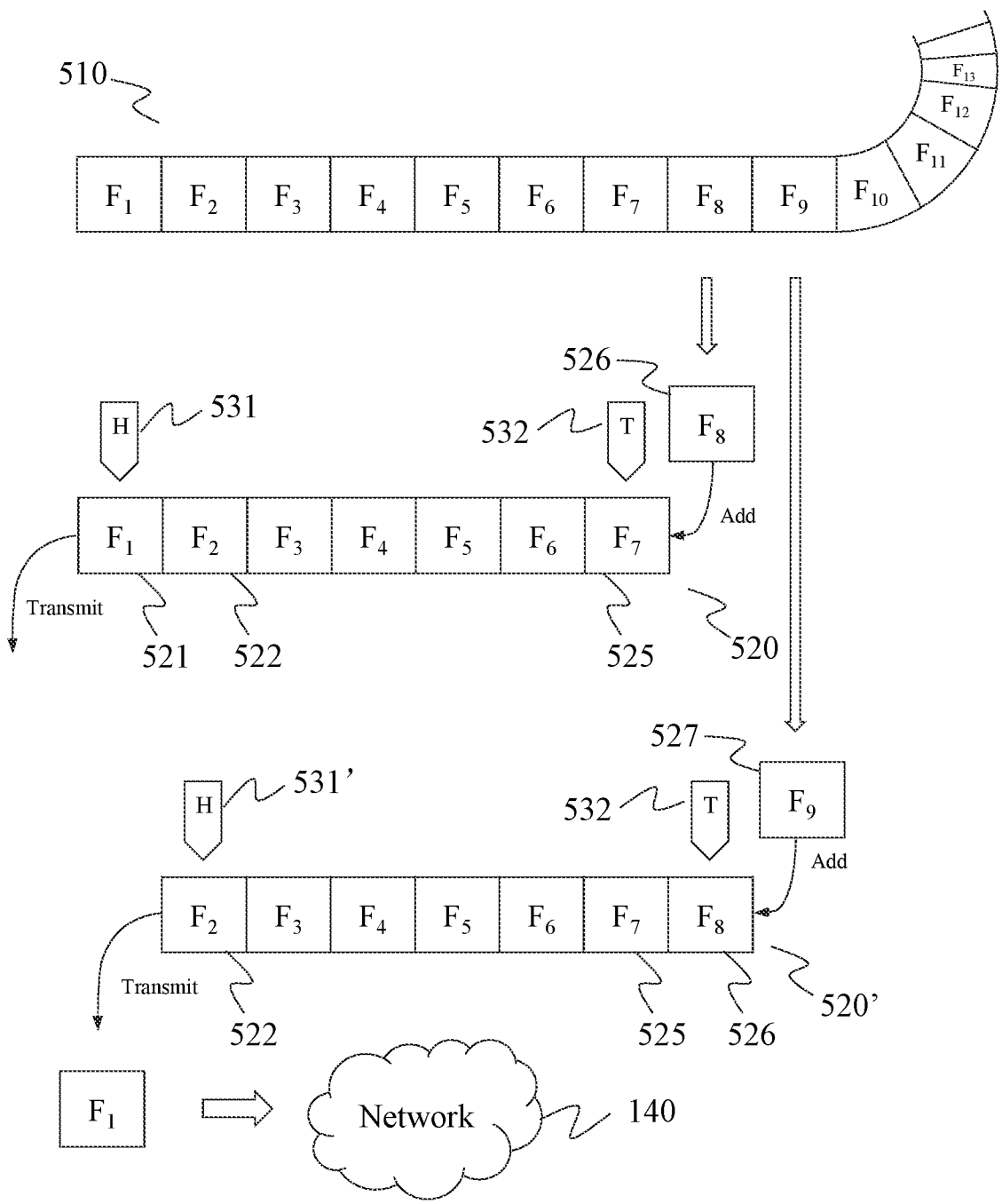
FIGS. 5 to 8 are schematic diagrams illustrating an exemplary queue and its management according to some embodiments of the present disclosure.
Figure 6:
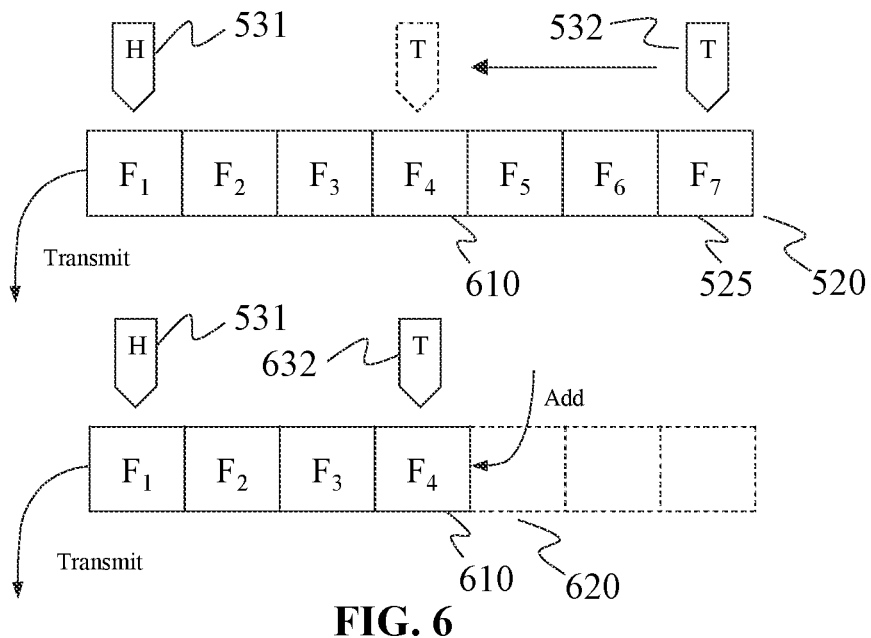
Figure 7:
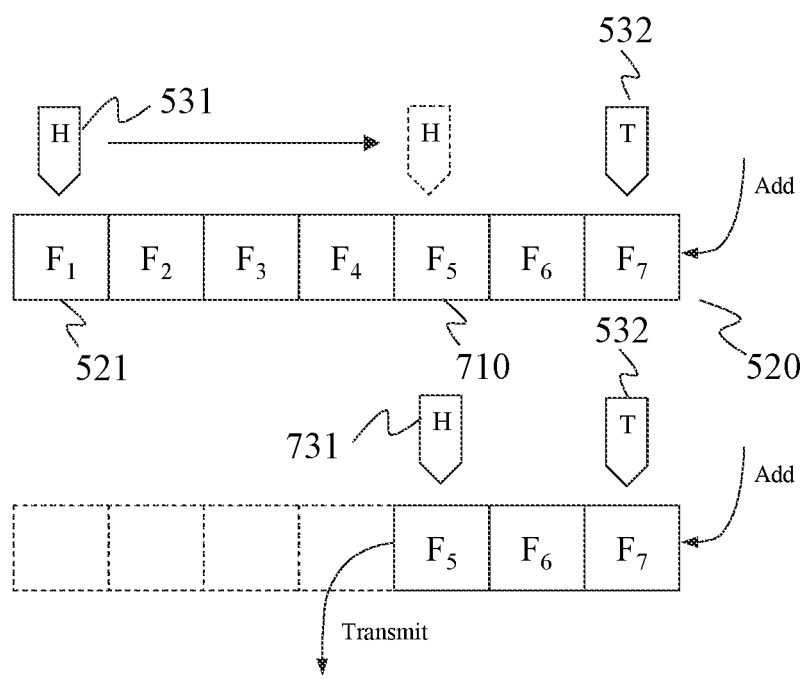
Figure 8:
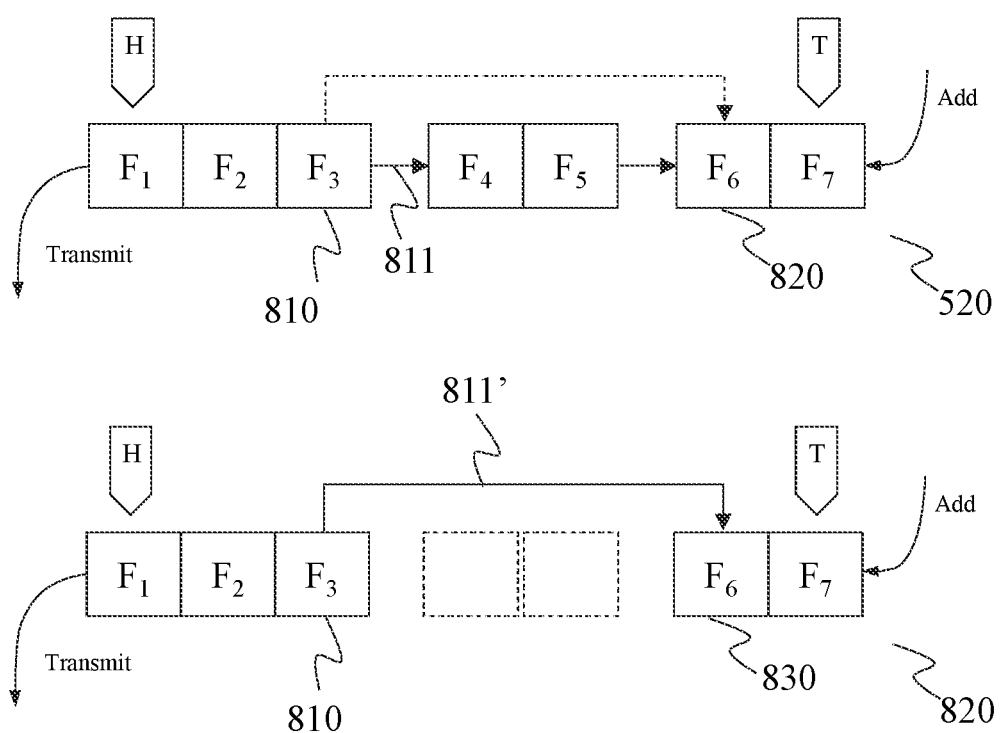

FIGS. 5 to 8 are schematic diagrams illustrating an exemplary queue and its management according to some embodiments of the present disclosure. FIG. 5 illustrates how to add new video frames into the queue and online transmits video frames from the queue through a network. Video 510 may be a video to be transmitted through the network 140. FIGS. 6 to 8 illustrate how to discard and/or remove video frames at different parts of the queue.

Video 510 may include a plurality of frames (e.g., $F_1$ to $F_{13}$). Before being transmitted, video 510 may be encoded (e.g., by the encoder 121) and be added into a queue 520 (e.g., by the buffer manager 122) as a whole or frame by frame.

In some embodiments, video frames of the video 510 firstly may all be encoded by the encoder 122 and then may be added into the queue 520.

In some embodiments, video frames of the video 510 may be encoded by the encoder 121 frame by frame, and each time when the encoding of a video frame or a certain number of video frames is completed, the encoded video frame or video frames may be added into the queue 520 immediately.

The queue 520 may include a plurality of queue units, each of which may hold a video frame, that is, each queue unit may store data of a video frame or information indicating a memory address (or a memory address range) indicating where the corresponding video frame is stored in the buffer 123. The queue 520 may include a head unit (e.g., queue unit 521) and a tail unit (e.g., queue unit 525). The head unit and the tail unit may also be referred to as the head and tail of the queue, respectively. Each queue unit may include a pointer pointing to the next queue unit except the tail unit. The pointer of the tail unit may point to no one or a deleted queue unit.

A head pointer 531 and a tail pointer 532 may be used (e.g., by the buffer manager 122) to indicate the head and tail of the queue 520. The head pointer 531 and the tail pointer 532 may point to the head unit and the tail unit respectively. By changing the head pointer 531 or the tail pointer 532 (e.g., changing the address information included in the head pointer 531 or the tail pointer 532) the head or tail of the queue may be changed accordingly. The size of a queue may be defined by the number (or total size) of the video frames held in the units between its head and tail.

A video frame (e.g., F) at the head (held by the head unit, indicated by the head pointer 531) of the queue 520 may be readily transmitted through the network 140 and the next queue unit (e.g., queue unit 522) of the queue may be set as the new head by changing the head pointer 531 to head pointer 531' (pointing to the queue unit 522) using the buffer manager 122. For adding a new video frame into the queue 520, the new video frame (e.g., newly encoded video frame FE) may be held by a new queue unit (e.g., queue unit 526), which may be appended and/or added after the original tail (held by the original tail unit, indicated by the tail pointer 532) by setting the pointer of the queue unit 525 to point to the queue unit 526 using the buffer manager 122. The queue unit 526 may also be set (e.g., by the buffer manager 122) as the new tail by changing the tail pointer 532 to tail pointer 532' (pointing to the queue unit 526) using the buffer manager 122.

In most situations, transmission of video frames and adding of new video frames may always be performed at the head and at the tail, respectively. For example, after $F_1$ has been transmitted and $F_8$ has been added into the queue 520, the formed queue 520' may have the queue unit 522 as its head and queue unit 526 as its tail. A video frame $F_2$ held by the queue unit 522 may be the next video frame to be transmitted, and a newly encoded video frame $F_9$ may be held by a queue unit 527, which is going to be appended and/or added after the queue unit 526 as a new tail unit. As frequencies of adding a video frame and transmission a video frame may be different and vary in time, the size of the queue may vary correspondingly.

FIG. 6 illustrates how to discard (or remove) video frames at the tail of a queue. The buffer manager 122 may discard contiguous video frames at the tail of the queue by changing the tail pointer. The adding of new video frame may be paused during this process and be resumed afterwards. The transmission of video frame may be paused or continued. For example, for discarding contiguous video frames $F_5$ to $F_7$ at the tail of the queue 520, the buffer manager 122 may change the tail pointer 532 to tail pointer 632. The tail pointer 532 may point to the queue unit 525. The tail pointer 632 may point to a queue unit 610 holding a video frame preceding the video frame $F_5$ ($F_4$). In some embodiments, the buffer manager 122 may change the pointer of the queue unit 610 (the new tail) so that it may point to no one. After the video frames $F_5$ to $F_7$ are discarded, a queue 620 may be formed, and the adding of new frame may be performed at the queue unit 610.

FIG. 7 illustrates how to discard (or remove) video frames at the head of a queue. The buffer manager 122 may discard contiguous video frames at the head of the queue by changing the head pointer. In some embodiments, the transmission of video frame may be paused during this process and be resumed afterwards. The adding of new video frame may be paused or continued. For example, for discarding contiguous video frames $F_1$ to $F_4$ at the head of the queue 520, the buffer manager 122 may change the head pointer 531 to head pointer 731. The head pointer 531 may point to the queue unit 521. The head pointer 731 may point to a queue unit 710 holding a video frame next to the video frame $F_4$ ($F_5$). After the video frames $F_1$ to $F_4$ are discarded, a queue 720 may be formed, and the transmission of video frame may be performed at the queue unit 710.

FIG. 8 illustrates how to discard (or remove) video frames in a queue. The buffer manager 122 may discard contiguous video frames in a queue by changing a pointer of a queue unit preceding the contiguous video frames. The transmission of video frames and adding of new video frame may be paused or continued during this process. For example, for discarding contiguous video frames $F_4$ and $F_5$ in the queue 520, the buffer manager 122 may change a pointer 811 of a queue unit 810 to a pointer 811'. The queue unit 810 may precede the queue unit holding the video frame $F_4$ and have its pointer 811 pointing to it. The pointer 811' may point to the queue unit 820, which is next to the queue unit holding the video frame $F_5$. After the video frames $F_4$ and $F_5$ are discarded, a queue 820 may be formed. And when video frame $F_3$ is transmitted, the next video frame to be transmitted is video frame Fe.

Alternatively or additionally, the discarding the video frames in a queue may also be implemented by discarding the video frames at the head of the queue at a right time. For example, for discarding video frames $F_4$ and $F_5$, the transmission of the video frames may be kept performing until the video frame $F_4$ becomes the head of the queue. Then the buffer manager 123 may discard video frames $F_4$ and $F_5$ by changing the head pointer of the queue.

Figure 9:
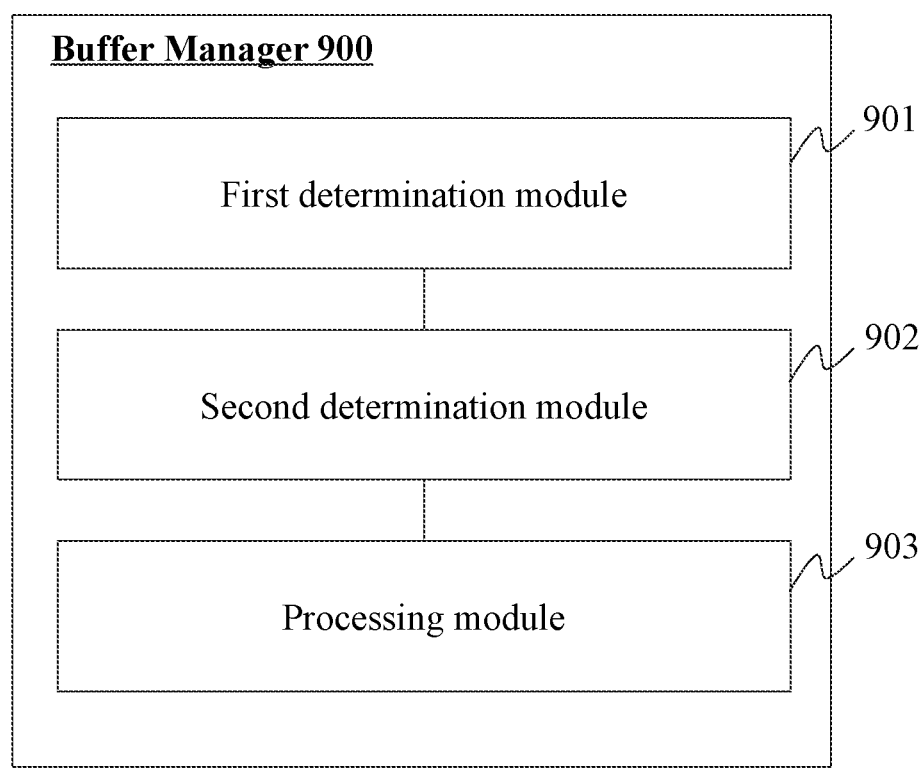
FIG. 9 is a schematic diagram illustrating an exemplary buffer manager according to some embodiments of the present disclosure.

FIG. 9 is a schematic diagram illustrating an exemplary buffer manager according to some embodiments of the present disclosure. Buffer manager 900 may be an embodiment of the buffer manager 122. In some embodiments, the buffer manager 900 may be a device for processing video frames in a queue implemented by the buffer 123. The buffer manager 900 may perform process 1000 and process 1100 as illustrated in FIG. 10 and FIG. 11, respectively. As shown in FIG. 9, the buffer manager 900 may include a first determination module 901, a second determination module 902, and a processing module 903. Other modules may also be included in the buffer manager 900.

The first determination module 901 may be configured to determine a transmission performance of a network (e.g., the network 140) for a queue of video frames. The buffer 123 may store a video (or a plurality of video frames) obtained (e.g., by the buffer manager 122) from the camera 111, the media server 112, or the encoder 121 (the encoder 121 may also be integrated into the camera 111 or the media server 112 in some embodiments). The plurality of video frames may be stored in the form of a queue, i.e., the queue of video frames. The queue of video frames may include a plurality of video frames. Each video frame in the queue may be associated with a level (priority level). The level may represent an importance or necessity of the associated video frame. The level may also represent a discarding or transmission priority of the associated video frame. The transmission performance of the network 140 may be indicated or measured by a data transmission rate of the network 140 (e.g., measure by a data transmission rate and/or a video frame loading rate of the transmitter 124), a congestion degree of the network 140 (e.g., measured by the response time of the network 140), a condition of the buffer 123 (e.g., measured by the memory usage of the buffer 123), or the like, or a combination thereof.

The first determination module 901 may also be configured to determine a congestion level of a queue as an indicator of the transmission performance of the network 140. The first determination module 901 may determine the congestion level periodically or whenever one or more video frames are obtained by the buffer manager 900, added into the queue by the buffer manager 900 or transmitted by the transmitter 124. The one or more video frames may be of any type or of a certain type. Alternatively or additionally, the first determination module 901 may determine the congestion according to the memory usage of the buffer 123.

In some embodiments, the first determination module 901 may be configured to obtain a current video frame and determine the congestion level of the queue upon determining that the current video frame is an independently decodable video frame (e.g., an I-frame).

The second determination module 902 may be configured to determine a maximum discarding level based on the transmission performance of the network (e.g., the network 140). The first determination module 901 and the second determination module 902 may use a same indicator of the transmission performance of the network.

In some embodiments, the second determination module 902 may be configured to determine the maximum discarding level based on the congestion level of the queue. The maximum discarding level may be used by the processing module 903 for discarding video frames with lower levels (priority levels).

The processing module 903 may be configured to discard (or remove) a target video frame of which the associated priority level is low than or equal to the maximum discarding level from the queue. It may be noted that, the queue may include a plurality of target video frames. The singular forms "a", and "the" used herein may also include plural forms as well. If a plurality of target video frames are included in the queue, the processing module 903 may discard all of them in a single operation. Alternatively or additionally, the processing module 903 may discard the target video frames in batches based on, for example, the transmission performance of the network.

The level of video frame in the queue may be determined (e.g., by the processing module 903) based at least on a level (interest level) of a specified event scene included in the video frame. The level of the specified event scene may represent a degree of attention or interest to that specified event scene. The detailed descriptions of the specified event scene and its level are provided elsewhere (e.g., in connection with FIG. 11) in the present disclosure.

In some embodiments, the first determination module 901 may be configured to determine whether the current video frame is an independently decodable video frame based on the type of the current video frame. The first determination module 901 may also determine an initial level (initial priority level) of the current video frame. For example, the first determination module 901 may analyze the information included in the video frame. If the current video frame is an I-frame, then the first determination module 901 may determine that the current video frame is an independently decodable video frame. The first determination module 901 may determine the initial level of the current video frame based on the content (e.g., specified event scene) of the current video frame.

In some embodiments, after discarding the video frames with levels lower than or equal to the maximum discarding level, the processing module 903 may also be configured to add the current video frame into the queue, and label or designate the level of the current video frame as the initial level of the current video frame.

In some embodiments, the processing module 903 may obtain the current video frame and determine the type of the current video frame. Upon determining that the current video frame is a dependently decodable video (e.g., a P-frame), the processing module 903 may obtain another video frame, wherein the another video frame and the current video frame belong to a same GOP and the level (priority level) that is associated with the another video frame is lower than the level of the current video frame. The processing module 903 may also be configured to change the level that is associated with the another video frame (may also be referred to as a low-level video frame) to the level (or initial level) of the current video frame. The processing module 903 may then add the current video frame into the queue, and label or designate the level of the current video frame as the initial level of the current video frame.

It may be noted that, the queue may include a plurality of low-level video frames that belong to the same GOP as the current video frame. The singular forms "a", "an", and "the" used herein may also include plural forms as well. The processing module 903 may obtain all the low-level video frames and change the levels of them to the level (or initial level) of the current video frame.

In some embodiments, the second determination module 902 may be configured to set the level of the specified event scene in advance according to the degree of attention to the specified event scene. The higher the degree of attention to the specified event scene is, the higher the level of the specified event scene is. The second determination module 902 may determine the maximum discarding level based on a preset relationship between the transmission performance of the network (e.g., the congestion level) and the maximum discarding level. The relationship may be in a form of a look-up table, a function, or the like, or a combination thereof.

In some embodiments, the first determination module 901 may be configured to determine whether the current video frame includes any specified event scene. Upon determining that the current video frame includes at least one specified event scene, the first determination module 901 may determine a level for each specified event scene of the at least one specified event scene and label or designate a highest level of the at least one specified event scene as the initial level of the current video frame.

It may be noted that, the above descriptions about the buffer manager 900 are only for illustration purposes, and are not intended to limit the present disclosure. It is understandable that, after learning the major concept and the mechanism of the present disclosure, a person of ordinary skill in the art may alter the buffer manager 900 in an uncreative manner. The alteration may include combining and/or splitting modules or sub-modules, adding or removing optional modules or sub-modules, etc. All such modifications are within the protection scope of the present disclosure.

FIG. 10 is a schematic diagram illustrating an exemplary process for processing video frames according to some embodiments of the present disclosure. Process 1000 may be performed to achieve step 440 of process 400 illustrated in FIG. 4. One or more steps of process 1000 may be performed by the buffer manager 900. In some embodiments, one or more operations of process 1000 may be performed by the computing device 200 (illustrated in FIG. 2) implementing related functions of the buffer manager 122. For example, process 1000 may be stored in the storage 220 in the form of instructions, and invoked and/or executed by the processor 210.

Process 1000 may be performed by the buffer manager 122 for discarding video frames of inter-frame compressed (e.g., MPEG) or intra-frame compressed video data (e.g., motion JPEG-2000, iFrame). Detailed description of inter-frame compression and intra-frame compression are provided elsewhere (e.g., in connection with FIG. 12) is the present disclosure.

In step 1010, the first determination module 901 may determine the transmission performance of a network (e.g., network 140) for a queue of video frames. The buffer 123 may store a video (or a plurality of video frames) obtained (e.g., by the buffer manager 122) from the camera 111, the media server 112, or the encoder 121 (the encoder 121 may also be integrated into the camera 111 or the media server 112 in some embodiments). The plurality of video frames may be stored in the form of a queue, i.e., the queue of video frames. The queue of video frames may include a plurality of video frames. Each video frame in the queue may be associated with a level (priority level). The transmission performance of the network 140 may be measured by a network bandwidth of the network 140, a data transmission rate and/or a video frame loading rate of the transmitter 124, a response time of the network 140, the congestion level of the queue of the buffer 123, or the like, or a combination thereof.

In some embodiments, the first determination module 901 may determine a congestion level of a queue as an indicator of the transmission performance. The first determination module 901 may determine the congestion level periodically (e.g., once per 10 ms, 100 ms, 500 ms, 1 s, 2 s, 5 s, 10 s). As another example, the first determination module 901 may determine the congestion when the memory usage of the buffer 123 exceed a certain usage size (e.g. 100 KB, 1 MB, 10 MB, 100 MB, 1 GB, 10 GB, 100, GB, 1 TB) or exceed a certain usage percentage (e.g., 40%, 50%, 60%, 70%, 80%, 90%, 95%). As a further example, the first determination module 901 may determine the congestion level whenever a video frame (current video frame) or a predetermined number (e.g., 1, 2, 5, 10, 20, 30) of video frames are obtained by the buffer manager 900, added into the queue by the buffer manager 900, or transmitted by the transmitter 124. As yet a further example, the first determination module 901 may determine the congestion level whenever a video frame of a certain type (e.g., an independently decodable video frame) or a predetermined number (e.g., 1, 2, 5, 10, 20, 30) of video frames of a certain type are obtained by the frame buffering queue manager or transmitted by the transmitter 124.

In some embodiments, the first determination module 901 may determine the congestion level of the network based on the memory usage of a video buffering unit (e.g., buffer 123), or more specifically, the queue included in the video buffering unit. For instance, when the congestion level of the network is high, the rate of transmitting the frames through the network 140 may be lower than the rate of adding frames into the buffer 123. As a result, the memory usage of the queue may achieve a usage size (e.g. 100 KB, 1 MB, 10 MB, 100 MB, 1 GB, 10 GB, 100, GB, 1 TB) or a usage percentage (e.g., 40%, 50%, 60%, 70%, 80%, 90%, 95%). The first determination module 901 may determine the congestion level of the based on the usage size or the usage percentage.

It may be noted that, other determination techniques in the prior art may also be used in step 1010.

In some embodiments, in step 1010, the first determination module 901 may obtain a video frame (the current video frame) from the encoder 121 or the media server 112. The first determination module 901 may then determine an initial level (initial priority level) of the current video frame. The first determination module 901 may determine the initial level of the current video frame based on the content (e.g., specified event scene) of the current video frame. For example, the first determination module 901 may determine whether the current video frame includes any specified event scene. Upon determining that the current video frame includes at least one specified event scene, the first determination module 901 may determine a level (interest level) for each specified event scene included in the current video frame, and label or designate a highest level of the at least one specified event scene included in the current video frame as the initial level of the current video frame.

In some embodiments, the first determination module 901 may include an event detection unit to perform a detection on the current video frame. The event detection unit may analyze the current video frame by, for example, extracting features from the current video frame. The event detection unit may then determine if there are any specified event scenes included in the event detection unit or current video frame by analyzing the extracted features and output a result. The first determination module 901 may then determine the initial level of the current frame based on the result output by the event detection unit. The event detection unit may use various techniques well known in the art to perform the feature extractions as well as the feature analysis. For example, the event detection unit may extract and/or analyze the feature using a neural network (e.g., a convolutional neural network), principal component analysis, a support vector machine, or the like, or a combination thereof.

Detailed descriptions of the determination of the initial level are provided elsewhere (e.g., in connection with FIG. 11) in the present disclosure.

In some embodiments, in step 1010, the first determination module 901 may determine whether the current video frame is an independently decodable video frame based on the type of the current video frame (e.g., I-frame, P-frame). The first determination module 901 may determine the congestion level of the queue when the current video frame is determined to be an independently decodable video frame (e.g., I-frame).

In step 1020, the second determination module 902 may determine a maximum discarding level based on the transmission performance of the network. The indicator of the transmission performance of the network used in step 1010 and step 1020 may be the same. For example, when the first determination module 901 uses a congestion level of the queue as the indicator of the transmission performance of the network 140, the second determination module 902 may also determine the maximum discarding level based on the congestion level of the queue.

In some embodiments, for determining the maximum discarding level based on the congestion level of the queue, the second determination module 902 may perform the determination based on a pre-set relationship between the congestion level and the maximum discarding level. The relationship may be in a form of a look-up table, a function, or the like, or a combination thereof.

In some embodiments, the maximum discarding level and the congestion level of the queue may be in forms of comparable numbers. The maximum discarding level may be equal to the congestion level of the queue, or be equal to the congestion level of the queue minus 1.

In step 1030, the processing module 903 may remove or discard a target video frame of which the associated level (priority level) is lower than or equal to the maximum discarding level. The level of each video frame in the queue (including the target video frame and any other video frame) may be determined (e.g., by the processing module 903) based at least on a level (interest level) of a specified event scene included in that video frame.

The level of the specified event scene may be designated by a user (e.g., of the video processing system 100, of the terminal 130) through the second determination module 902 based on his/her own interest or attention degree to the specified event scene included in the video. For example, the user may be a law (e.g., traffic law, penal law) enforcer and he/she may have a higher interests or attention degree to the law-violation related event scenes (e.g., a law-violation activity, a presence of a participant). Correspondingly, the law-violation related event scenes in the video (e.g., a traffic monitoring video, a security monitoring video) may be set with higher levels, and the higher the importance and/or law-violation degree of the event scene, the higher the level it may be set with. As another example, the user may be a sport fan, and he/she may have a higher interests or attention degree to the scoring moment related event scenes in the video (e.g., a sport video, a live broad cast). So the scoring moment related event scenes may be set with higher levels. Additionally or alternatively, the specified event scene may relate to emergency monitoring, baby care, patient care, pet care, video call, video conference, TV shows, etc.

Some detailed descriptions of the specified event scene and the frame discarding are provided elsewhere (e.g., in connection with FIG. 11) in the present disclosure.

In some embodiments, after step 1030 (e.g., in step 430 or 450), the processing module 903 may add the current video frame into the queue (the target video frames has been removed). The processing module 903 may label or designate the level of the current video frame as the initial level of the current video frame (e.g., by the first determination module 901).

In some embodiments, the processing module 903 may add the current video frame into the queue without changing the levels of the residual video frames in the queue. For example, when the current video frame is determined (e.g., by the first determination module 901) as an independently decodable video frame (e.g., I-frame), or if the current video frame is determined as a dependently decodable video frame with a level lower than or equal to the tail frame of the queue, the processing module 903 may also not change the levels of the residual video frames in the queue.

In some embodiments, the processing module 903 may obtain the current video frame and add the current video frame into the video frame buffering queue as well as change levels of one or more video frames in the video frame buffering queue. Upon determining that the current video frame is a dependently decodable video, the processing module 903 may obtain another video frame. The another video frame and the current video frame may belong to a same GOP and the level (priority level) that is associated with the another video frame may be lower than the priority level of the current video frame. The processing module 903 may change the level that is associated with the another video frame to the level (or initial level) of the current video frame.

An embodiment of process 1000 is described in connection with FIG. 11 in detail.

It may be noted that the above descriptions of video frame processing are only for demonstration purposes, and not intended to limit the scope of the present disclosure. It is understandable that, after learning the major concept and the mechanism of the present disclosure, a person of ordinary skill in the art may alter process 1000 in an uncreative manner. For example, the operations above may be implemented in an order different from that illustrated in FIG. 10. One or more optional operations may be added to the flowcharts. One or more operations may be divided or be combined. All such modifications are within the protection scope of the present disclosure.

It may be noted that, in the present disclosure, the term "level" may refer to any parameter that may be used to indicate a degree or a category of a corresponding aspect and is not intended to be limiting. The "level" may have various forms. For example, for indicating the state of the buffer 123 or the frame transmitting speed, a congestion level of the queue may be in the form of a normal level (e.g., 1, 2, 3, A, B, C, I, II, III), a percentage (e.g., 50%, 80%, 95%), a text description (e.g., low, moderate, high, very high), a meaningful value (e.g., 10 frames/s, 100 KB/s), or the like, or a combination thereof. As another example, for indicating the importance or necessity of a frame, a level of a video frame may be in the form of a number of a normal level (e.g., 1, 2, 3, A, B, C, I, II, III), a category (e.g., discardable, discardable-in-need, non-discardable), or the like, or a combination thereof.

It may also be noted that, the sentence " . . . a level lower than or equal to . . . "and" . . . a level lower than . . . " in the present disclosure may not necessarily mean that both the maximum discarding level and the level (priority level) of the video frame have forms of comparable values. The comparing of the maximum discarding level and the level of a video frame may be interpreted as determining the importance, priority and/or the transmission necessity of the video frame. For example, a level "discardable-in-need" may be determined as "lower than" a level "non-discardable". The processing module 903 may discard the video frames with low importance and/or transmission necessity based on the maximum discarding level.

FIG. 11 is a schematic diagram illustrating an exemplary process for processing video frames according to some embodiments of the present disclosure. Process 1100 is an embodiment of process 1000 illustrated in FIG. 10. One or more steps of process 1100 may be performed by the buffer manager 122. In some embodiments, one or more operations of process 1100 may be performed by the computing device 200 (illustrated in FIG. 2) implementing related functions of the buffer manager 122. For example, process 1100 may be stored in the storage 220 in the form of instructions, and invoked and/or executed by the processor 210. Process 1100 may be performed by the buffer manager 122 for discarding video frames of inter-frame compressed video data (e.g., MPEG). As shown in FIG. 1, process 1100 may include the following steps:

Step 1110: determining a congestion level of a video frame buffering queue (may also be referred to as a queue or a queue of video frames) upon determining that a current video frame is an independently decodable video frame. Step 1110 may be performed by the first determination module 901. Step 1110 may be an embodiment of step 1010 of process 1000. Some related descriptions of step 1010 may also be incorporated into step 1110.

Step 1120: determining a maximum discarding level based on the congestion level of the queue. Step 1120 may be performed by the second determination module 902. Step 1120 may be an embodiment of step 1020 of process 1000. Some related descriptions of step 1020 may also be incorporated into step 1120.

Step 1130: discarding, from the queue, a video frame of which an associated level (priority level) is lower than or equal to the maximum discarding level, wherein the level of each video frame in the queue is determined based at least on a level (interest level) associated with a specified event scene included in that video frame. Step 1130 may be performed by the processing module 903. Step 1130 may be an embodiment of step 1030 of process 1000. Some related descriptions of step 1030 may also be incorporated into 1130.

Figure 12:
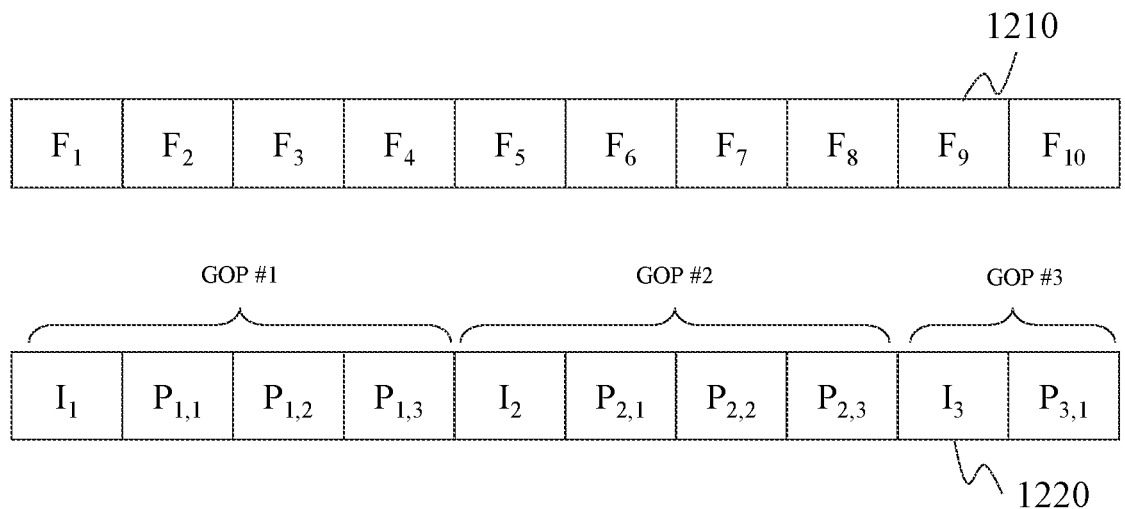
FIG. 12 is a schematic diagram illustrating an inter-frame video compression technique adopted by the encoder according to some embodiments of the present disclosure.

In some specific embodiments of process 1100, types of video frames may include video frames that can be decoded independently (independently decodable video frames, such as an I-frame) and video frames that cannot be decoded independently (dependently decodable video frames, such as a P-frame). In a video compression technology used by the moving picture experts group (MPEG) as illustrated in FIG. 12, an I-frame is usually the first frame of each group of pictures (GOP). After being moderately intra-frame compressed (e.g., by the encoder 121), as a reference point for random accessing, the I-frame may describe details of an image background and a motion subject. A complete image may be reconstructed only by decoding the I-frame data (e.g., by the terminal 130). The I-frame may be decoded independently without reference to other video frames. A P-frame may be generated by compressing a current frame data based on a difference between the current frame and an adjacent preceding frame (an I-frame or a P-frame) for improving the compression rate (inter-frame compression). The decoding of the P frame may depend on the adjacent preceding frame and cannot be performed independently.

The congestion level of the queue may be determined (e.g., by the first determination module 901) when the current video frame is determined as an independently decodable video frame. The obtained video frame may be analyzed (e.g., by the first determination module 901) to determine whether the current video frame is a P-frame or an I-frame. When the current video frame is determined as an I-frame, the congestion level of the video buffering queue may be determined. In some specific embodiments, frame discarding determination may be initiated (e.g., by the buffer manager 122) when the current video frame is an independently decodable video frame, thus ensuring that the remaining video frames can still be decoded after partial frame loss of a GOP. In some embodiments of the present disclosure, it is possible to determine the type of the current video frame periodically, and the period may be set according to the specific situation (e.g., based on the transmission performance of the network 140, the application field of the video processing system 100, the size of the buffer 123). The period may be set as 10 ms, 100 ms, 500 ms, 1 s, 2 s, 5 s, 10 s, etc. The congestion level of the queue may also be determined based on the memory usage of a video buffer unit, or be determined using other determining methods in the prior art. The determining method is not particularly limited in the embodiments of the present disclosure.

Based on the congestion level of the queue, the maximum discarding level may be determined (e.g., by the second determination module 902). In some specific embodiments, the congestion level of the queue may be different in different network environments. For different congestion levels of the queue, the corresponding levels of video frames for discarding may also be different. So each time the congestion level of the current queue is determined, the maximum discarding level may be obtained for providing reference for the subsequent frame discarding. Different frame discarding strategies may be determined (e.g., by the second determination module 902) in accordance to different congestion levels to ensure the fluency of network transmission and the quality of video transmission as far as possible.

Video frames whose levels (priority levels) are lower than or equal to the maximum discarding level in the queue may be discarded, wherein the level of each video frame in the queue is determined based at least on the level of the specified event scene included in the video frame. In some specific embodiments, all the video frames having frame levels lower than the corresponding congestion levels can be discarded directly or be discarded in phases (or batches). For example, when a corresponding congestion level is reached for the first time, only a part of frames having a frame level lower than the corresponding congestion level may be discarded (e.g., by the processing module 903); when the congestion level is reached for one or more times again, all the low-level video frames may be discarded. The level of each video frame in the queue may be determined (e.g., by the first determination module 901) based at least on the level (interest level) of the specified event scene(s) included in the video frame, and the level of the specified event scene included in the video frame may be set (e.g., by the first determination module 902) according to the degree of attention to the specified event scene. The transmission of effective video frames is ensured by determining the level of the video frame based on the event scene in the video frame rather than discarding video frames according to the type of video frames. The level of the event scene may be set according to requirements at the time of specific application. For example, the video processing system 100 may be used for traffic monitoring, security monitoring, etc. The event scene may relate to one or more law violation activities, and the level of the event scene may be set based on a degree of law violation.

Through the above method, when the network bandwidth is insufficient, the maximum discarding level may be determined according to the congestion level of the queue. A video frame (or video frames) of which an associated level (priority level) lower than or equal to the maximum discarding level may be discarded from the queue, while high-level video frames in the queue may be reserved and sent (e.g., by the transmitter 124) to the network. The priority transmission of effective data may be ensured and the loss due to effective data missing may be reduced.

In some embodiments, an initial level (initial priority level) of the current video frame may be determined (e.g., by the first determination module 901) using the following method, including: determining whether the current video frame includes any specified event scene; upon determining that the current video frame includes at least one specified event scene, determining a level (interest level) for each specified event scene in the current video frame based on a pre-set level information of specified event scenes; labelling or designating a highest level of the at least one specified event scene in the current video frame as the initial level of the current video frame;

In some embodiments, the level of the specified event scene may be set in advance according to a degree of attention to the specified event scene, and the higher the degree of attention to the specified event scene is, the higher the level of the specified event scene is.

In some embodiments, a specified event scene may mainly refer to an event scene a user pays attention to, and the user may designate the level of the specified event scene according to his/her own attention degree to the specified event scene. A video frame may include a plurality of types of event scenes simultaneously. The event scenes may include various types, such as motion detection, face detection, specified-shaped object detection, over-line detection, red light running, or the like. An embodiment of the present disclosure provides an example of determining the initial level of the current video frame. The type of a current event scene may be set (e.g., by the user, by the second determination module 902) as the over-line detection, the pre-set level information of specified event scenes may include three specified event scenes: no car passing, license plate number detection and car over-line detection. The corresponding level may be set according to the degree of attention to the three specified event scenes, no car passing, license plate number detection and car over-line detection. No car passing may be set to level 0, license plate number detection may be set to level 1, and car over-line detection may be set to level 2. The following situations may occur during the determining (e.g., by the first determination unit 901) of the initial level of the current video frame:

Situation 1: a specified event scene included in the current video frame is determined as no car passing. The level of the specified event scene of no car passing in the current video frame is determined as level 0 according to the pre-set level information of specified event scenes, and there is only one specified event scene of no car passing included in the current video frame. The highest level of the at least one specified event scene included in the current video frame is level 0, so the initial level of the current video frame may be determined as level 0.

Situation 2: a specified event scene included in the current video frame is determined as license plate number detection while car over-line detection is not included. The level of the specified event scene of license plate number detection in the current video frame is determined as level 1 according to the pre-set level information of specified event scenes, and there is only one specified event scene of license plate number detection in the current video frame. The highest level of levels of the specified event scenes included in the current video frame is level 1, so the initial level of the current video frame may be determined as level 1.

Situation 3: a specified event scene included in the current video frame is determined as car over-line detection while license plate number detection is not included. The level of the specified event scene of car over-line detection in the current video frame is determined as level 2 according to the pre-set level information of specified event scenes, and there is only one specified event scene of car over-line detection in the current video frame. The highest level of levels of the specified event scenes included in the current video frame is level 2, so the initial level of the current video frame may be determined as level 2.

Situation 4: specified event scenes included in the current video frame scene are determined as license plate number detection and car over-line detection. The level of the specified event scene of license plate number detection in the current video frame is determined as level 1 and the level of the specified event scene of car over-line detection is determined as level 2 according to the level information of specified event scenes. The level of the specified event scene of car over-line detection in the current video frame is higher than the level of the specified event scene of license plate number detection, so the highest level among levels of the specified event scenes included in the current video frame is level 2, so the initial level of the current video frame may be determined as level 2 to ensure that the initial level of the current video frame is consistent with the user's attention degree to the event. Alternatively, the levels of the specified event scenes included in the current video frame may also be weighted summed to obtain the initial level of the current video frame. However, according to this implementation, the final determined level of the current video frame may be relatively high when there are multiple low-level events included in the current video frame, causing the level of the current video frame inconsistent with the user's attention degree to the event.

With the above method, the initial level of the video frame may be determined (e.g., by the first determination module 901) based on the level of the specified event scene(s) included in the video frame. Since the level of the specified event scene in the video frame is pre-set according to the degree of attention to the specified event scene, the more effective the data included in the specified event scene in the video frame is, the higher a level is set to the specified event scene. Thus the more effective the data included in the current video frame is, the higher the initial level of the current video frame is, and the smaller the probability of discarding (or removing) the current video frame is when the network bandwidth is insufficient. As a result, the probability of safe transmission of effective data in the current video frame is increased, and the loss due to effective data missing is reduced.

In some embodiments, the maximum discarding level may be determined (e.g., by the second determination module 902) based on a pre-set relationship between the congestion level and the maximum discarding level. In some specific embodiments, the maximum discarding level may be set (e.g., by the second determination module 902) as equal to the congestion level minus 1, as exemplified below.

An embodiment of the present disclosure provides an example of determining (e.g., by the second determination module 902) the maximum discarding level. The total space size of the queue is max_buffer_size, the total size of the video frame data buffered in the queue currently is busy_buffer_size, the ratio of the total size of the video frame buffered in the current queue currently to the total space size of the queue is busy_buffer_ratio, the current congestion level is congest_level, and the maximum discarding level in the queue is max_drop_level. busy_buffer_ratio is equal to busy_buffer_size divided by max_buffer_size, and the greater its value is, the higher the network congestion level may be. An embodiment of the present disclosure describes a case where three specified event scene levels are set, correspondingly, the congestion levels includes four levels. When busy_buffer_ratio is lower than or equal to 50%, the congest_level may be set (e.g., by the first determination module 901) to 0; when busy_buffer_ratio is greater than 50% and lower than or equal to 80%, congest_level may be set to 1; when busy_buffer_ratio is greater than 80% and lower than or equal to 95%, congest_level may be set to 2; and when busy_buffer_ratio is greater than 95% and lower than or equal to 100%, congest_level may be set to 3. When congest_level is greater than 0, max_drop_level may be equal to congest_level minus 1 (e.g., set by the second determination module 902). Table 1 schematically illustrates an example for determining the maximum discarding level.

TABLE 1

An example for determining the maximum discarding level

| congest_level | 0 | 1 | 2 | 3 |
|---|---|---|---|---|
| max_drop_level | invalid | 0 | 1 | 2 |
| busy_buffer_ratio | [0%, 50%] | (50%, 80%] | (80%, 95%] | (90%, 100%] |

With the above method, since the levels of discardable (or removable) video frames may be in positive correlation with the congestion level of the network, the level of the video frame may be determined (e.g., by the first determination module 901, by the processing module 903) according to the level of specified event scene included in the video frame, so the corresponding congestion levels may be pre-configured according to the levels of the specified event scene. When a congestion occurs, the maximum discarding level may be determined (e.g., by the second determination module 902) according to the corresponding pre-set relationship between the congestion level and the maximum discarding level, so that at the time of the frame discarding, the corresponding low-level video frame including the specified event scene may be discarded (e.g., by the processing module 903) effectively according to the congestion level.

In some embodiments, whether the current video frame is an independently decodable video frame may be determined (e.g., by the first determination module 901) according to the type of the current video frame, and the initial level of the current video frame may also be determined (e.g., by the first determination module 901);

After the video frames of which the associate levels lower than or equal to the maximum discarding level in the queue are discarded (e.g., by the processing module 903), the current video frame may be added (e.g., by the processing module 903) into the queue and the level of the current video frame may be labeled or designated as the initial level of the current video frame.

In an embodiment, the I-frame may be used as a trigger condition of the frame discarding. If the current video frame is an I-frame, the congestion level may be determined (e.g., by the first determination module 901) and the frame discarding may be performed (e.g., by the processing module 903) according to the congestion level. The type of the current event scene may be set (e.g., by the user, by the second determination module 902) as over-line detection, and the specified event scenes included in the current video frame scene may be determined (e.g., by the first determination module 901) as license plate number detection and car over-line detection, so the initial level of the current video frame may be determined (e.g., by the first determination module 901) as level 2. The congestion level may be presented by taking table 1 as an example. If the current congestion level is level 2, the maximum discarding level may be level 1. The video frames with levels lower than or equal to 1 in the queue may be discarded. The current video frame may be added into the queue, and the current video frame may be labeled or designated (e.g., by the processing module 903) as level 2.

Figure 13:
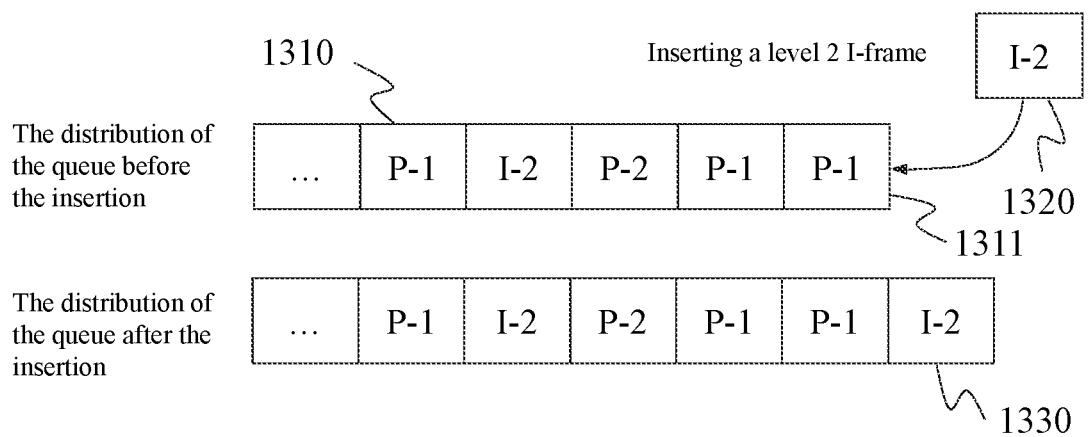
FIGS. 13 and 14 are schematic diagrams illustrating adding an I-frame into a queue according to some embodiments of the present disclosure.
Figure 14:
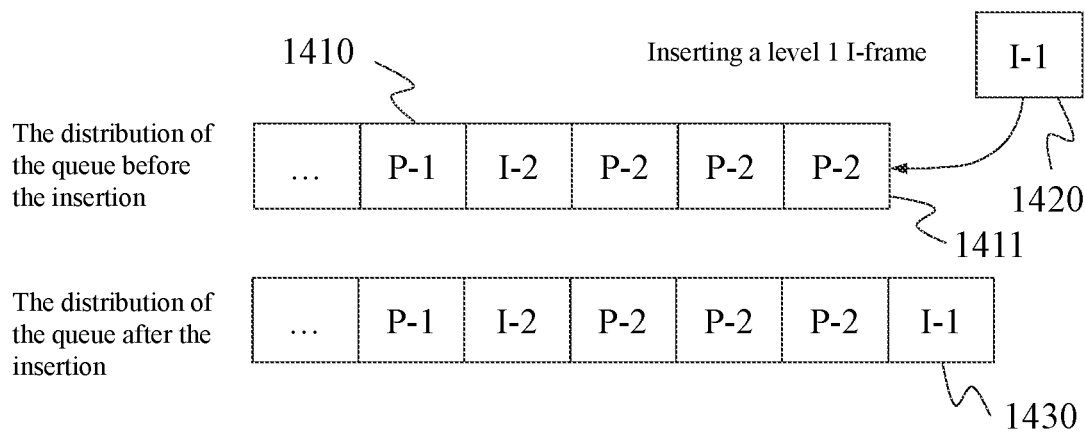

In the above embodiment, on the one hand, the I-frame is an independently decodable video frame and does not need any video frames to assist its decoding. So the I-frame may be labeled directly and added into the queue (e.g., by the processing module 903) as illustrated by FIGS. 13 and 14. On the other hand, each GOP includes an I-frame, thus by using the I-frame as a trigger condition of frame discarding, it may be determined (e.g., by the buffer manager 122) that whether a frame discarding is required and a related frame discarding operation is to be performed according to the congestion level of the network in each GOP cycle.

In some embodiments, if the current video frame is not an independently decodable video frame (e.g., a dependently decodable video frame such as P-frame), for a video frame belonging to the same GOP as the current video frame with a level lower than the initial level of the current video frame in the queue, its level may be changed (e.g., by the processing module 903) to the initial level of the current video frame; and the current video frame may be added (e.g., by the processing module 903) into the queue, and the level of the current video frame may be labeled (e.g., by the processing module 903) as the initial level of the current video frame.

Figure 15:
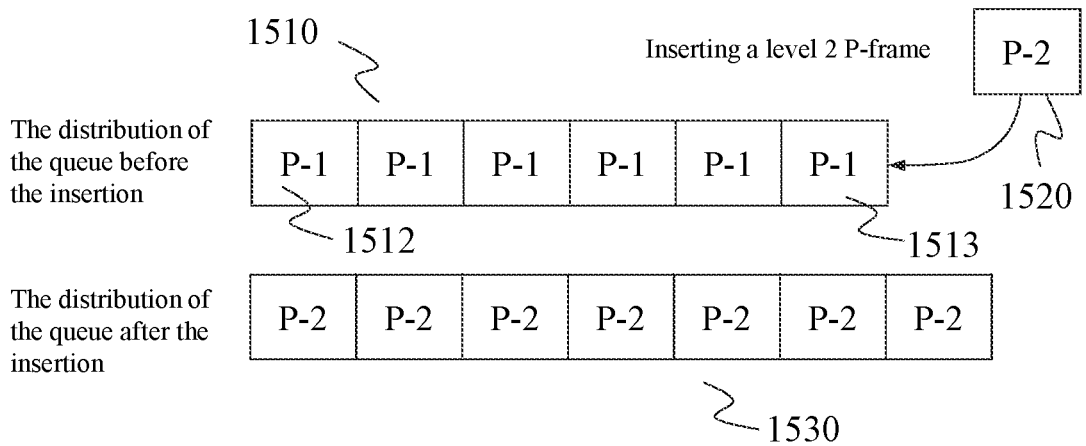
FIG. 15 is a schematic diagram illustrating a labeling of video frames until the head of the queue is reached according to some embodiments of the present disclosure.

In some specific embodiments, if the current video frame is a P-frame, for video frames belonging to the same GOP as the current video frame with levels lower than the initial level of the current video frame in the queue, their levels may be changed (e.g., by the processing module 903) to the initial level of the current video frame. The labeling of the video frames (e.g., the changing of the levels of the video frames) may be performed until any one of the following conditions is met:

Condition 1: labeling video frames (e.g., by the processing module 903) until the head of the queue is reached (which is also labeled). FIG. 15 is a schematic diagram illustrating a labeling of video frames until the head of the queue is reached according to some embodiments of the present disclosure. As shown in FIG. 15, the initial level of the current P-frame may be set as level 2 (e.g., by the first determination module 901), which is represented by P-2. Before the current P-frame is inserted into the queue, there are six level 1 P-frames in the queue, which are all represented by P-1. Before the current P-2 is inserted into the queue, starting from the tail of the queue, the levels of the level 1 video frames may be changed (e.g., by the processing module 903) into level 2 sequentially, and the labeling may be performed until the head of the queue is reached (and labeled). The P-2 frame may be inserted (e.g., by the processing module 903) into the queue to obtain a queue distribution after the insertion. The queue after insertion may consist of seven P-2 frames.

Figure 16:
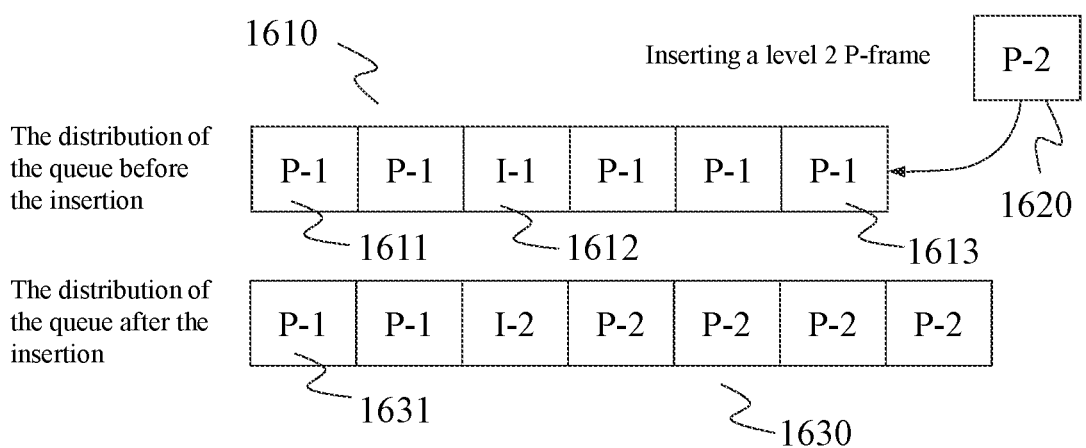
FIG. 16 is a schematic diagram illustrating a labeling of video frames until an I-frame of the same GOP is reached according to some embodiments of the present disclosure.

Condition 2: labeling video frames (e.g., by the processing module 903) until an I-frame of the same GOP is reached (which is also labeled). FIG. 16 is a schematic diagram illustrating a labeling of video frames until an I-frame of the same GOP is reached according to some embodiments of the present disclosure. As shown in FIG. 1b, the initial level of the current P-frame may be set to level 2 (e.g., by the first determination module 901), which is represented by P-2. Before the current P-frame is inserted into the queue, there are five level 1 P-frames, which are all represented by P-1, and a level 1 I-frame, which is represented by I-1, in the queue. Starting from the head of the queue, the arrangement sequence of the video frames is P-1 frame, P-1 frame, I-1 frame, P-1 frame, P-1 frame, P-1 frame. Before the current P-2 frame is inserted into the queue, starting from the tail of the queue, the levels of the level 1 video frames may be changed (e.g., by the processing module 903) into level 2, and the labeling may be performed until the I-frame is reached (and labeled). The P-2 frame may be inserted (e.g., by the processing module 903) into the queue, to obtain a queue distribution after the insertion. Starting from the head of the queue, the arrangement sequence of the video frames may be P-1 frame, P-1 frame, I-2 frame, P-2 frame, P-2 frame, P-2 frame, P-2 frame.

Figure 17:
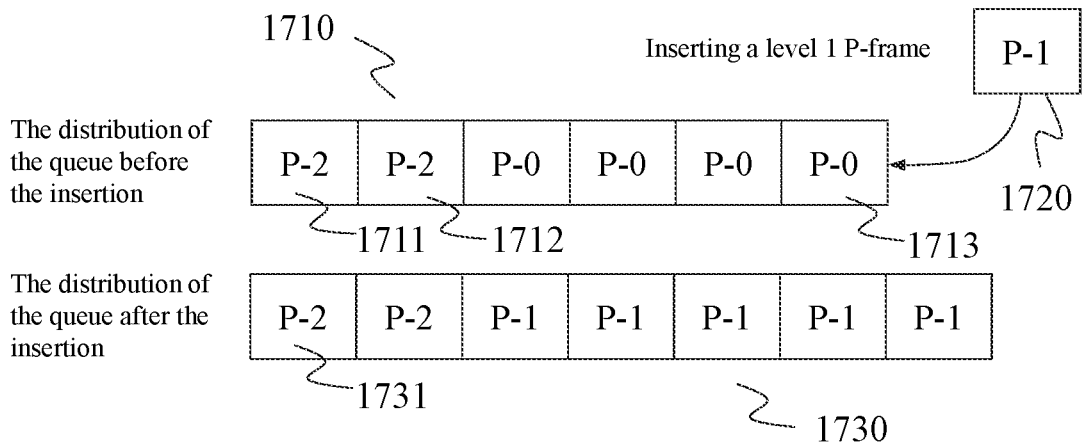
FIG. 17 is a schematic diagram illustrating a labeling of video frames until a frame with a level higher than the initial level of the current video frame in the queue is reached according to some embodiments of the present disclosure.

Condition 3: labeling video frames (e.g., by the processing module 903) until a frame with a level higher than the initial level of the current video frame in the queue is reached (which is not labeled). FIG. 17 is a schematic diagram illustrating a labeling of video frames until a frame with a level higher than the initial level of the current video frame in the queue is reached according to some embodiments of the present disclosure. As shown in FIG. 17, the initial level of the current P-frame may be set (e.g., by the first determination module 901) to level 1, which is represented by P-1. Before the current P-frame is inserted into the queue, there are two level 2 P-frames, which are all represented by P-2, and four level 0 P-frames, which are represented by P-0, in the queue. Starting from the head of the queue, the arrangement sequence of the frames is P-2 frame, P-2 frame, P-0 frame, P-0 frame, P-0 frame, P-0 frame. Before the current P-1 frame is inserted into the queue, starting from the tail of the queue, the levels of level 0 video frames may be changed (e.g., by the processing module 903) into level 1, and the labeling may be performed until a video frame with a level higher than the initial level of the current video frame is reached, that is, until a P-2 frame is reached (which is not labeled). The P-1 frame may be inserted (e.g., by the processing module 903) into the queue to obtain a queue distribution after insertion. Starting from the head of the queue, the arrangement sequence of the video frame may be P-2 frame, P-2 frame, P-1 frame, P-1 frame, P-1 frame, P-1 frame, P-1 frame.

According to the inherent characteristics of compression coding, the P-frame must have an adjacent preceding P-frame or I-frame for reference in order to be decoded. So when a frame discarding (or removing) is required due to a network congestion, reference-used P-frames or I-frame prior to a high-level P-frame (which all belong to a same GOP) cannot be discarded, even if these video frames do not include events that the user pays attention to. Therefor it may be necessary to change the levels (priority level) associated with the video frames in the queue, which belong to the same GOP as the current video frame and of which the associated levels are lower than the initial level of the current video frame, to the initial level (or level) of the current video frame to prevent the discarding of P-frames (reference-used) due to their low levels. As a result, the P-frame including effective data may be successfully decoded and effectively transmitted when the network bandwidth is insufficient.

Figure 18:
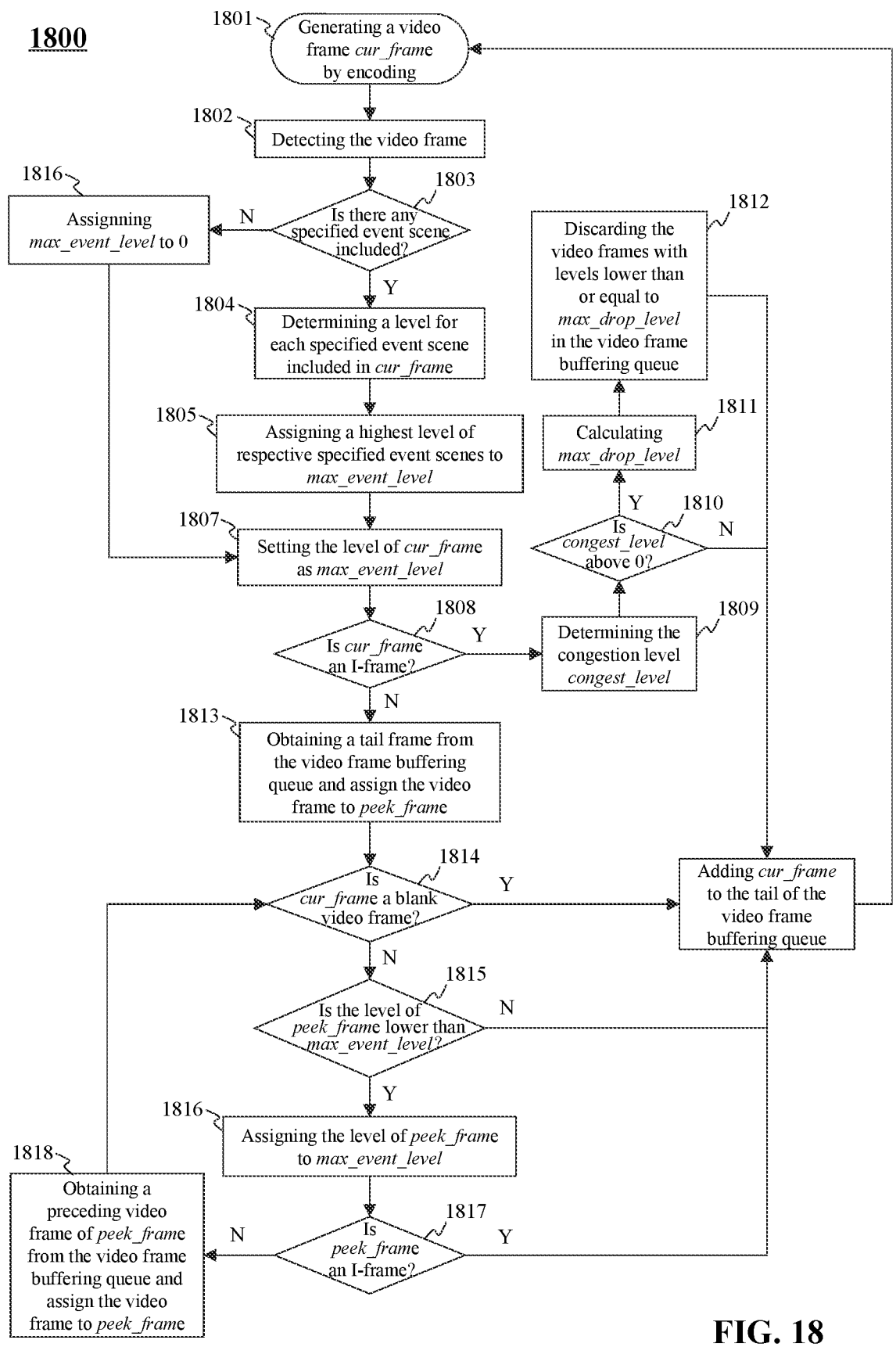
FIG. 18 is a schematic diagram illustrating a method and process of video frame processing according to some embodiments of the present disclosure.

In order to introduce the above method and the process more clearly, an embodiment of the present disclosure provides an example is illustrated in FIG. 18.

FIG. 12 is a schematic diagram illustrating an inter-frame video compression technique adopted by the encoder according to some embodiments of the present disclosure. Video data 1210 may be raw data of apiece of video obtained by the camera 111 or stored in the media server 112. Frames $F_1$ to $F_1$ may each include raw data corresponding to each frame of the piece of video. An image may be reconstructed (e.g., by a video player installed in the terminal 130) from each of the frames $F_1$ to $F_{10}$ to obtain a series of images. The video player may present the piece of video by sequentially displaying the series of images. The video data 1210 may usually be very large and the transmission (e.g., by the transmitter 124) of the video data 1210 may require a relatively huge amount of time and network bandwidth.

The video data 1210 may be compressed by encoding (e.g., by the encoder 121). In some video compression techniques only use intra-frame compressing techniques such as motion JPEG-2000 and iFrame, each of the frames $F_1$ to $F_{10}$ may be compressed (intra-frame compressed) only based on the data of its own, and a compressed frame may be obtained for each of the frames $F_1$ to $F_{10}$. Each of the compressed frame may be decompressed (or decoded) independently to reconstruct a complete image.

Inter-frame video compression technique (e.g., MPEG) may further reduce the size of the compressed video data (e.g., video data 1220). The obtained compressed video data may include independently decodable video frames (e.g., I-frames) and dependently decodable video frames (e.g., P-frames). By using Inter-frame video compression techniques, the transmission of the compressed video data may require less time, network bandwidth, and financial cost, etc. For demonstration purposes, an MPEG based technique is described herein for introducing the inter-frame video compressing technique, which is not intended to be limiting. The encoder 121 may adopt other inter-frame video compression techniques for encoding the video data 1210.

In the MPEG (moving picture experts group) based technique. The video data may be divided into a plurality of GOPs (groups of pictures, e.g., GOP #1 and GOP #2 illustrated in FIG. 12). The video frames included in a GOP may be compressed in different manners. For instance, the first video frame (e.g., $F_1$, $F_5$, $F_9$) in a GOP may be compressed (intra-frame compressed) only based on the data of their own. The obtained intra-frame compressed frame (e.g., $I_1$, $I_2$, $I_3$) may be referred to as an I-frame (Intra-frame) or an independently decodable video frame. The remaining frames (e.g., $F_2$ to $F_4$, $F_6$ to $F_8$, $F_{10}$) in the GOP may be compressed (intra-frame compressed) based on the data of their own and the data of an adjacent preceding frame data. The obtained inter-frame compressed frames (e.g., $P_{1,1}$ to $P_{1,3}$, $P_{2,1}$ to $P_{2,3}$, $P_{3,1}$) may be referred to as P-frames (Predicted-frame) or dependently decodable video frames.

The size of the I-frame may be larger than that of the P-frame. The I-frame may describe details of an image background and a motion subject. A complete image may be reconstructed by decoding the I-frame data (e.g., by the terminal 130) without any assistance of other video frames. The I-frame may be decoded independently without reference to other video frames. The P-frame may describe a difference between the current frame and an adjacent preceding frame. The decoding of the P-frame may depend on the adjacent preceding frame and cannot be performed independently. For successfully decoding a P-frame, the preceding frame (an I-frame or a P-frame) may also be required to be successfully decoded. Therefore all the frames before a P-frame to be decoded within a same GOP are needed to be transmitted (e.g., through the network 140) to the video player. For example, compressed frames 11, $P_{1,1}$, and $P_{1,2}$ may all be required to decode the compressed frame $P_{1,3}$.

A GOP may include an arbitrary number of frames. The number of frames of a GOP may be set based on the transmission performance of the network 140, a size of the video data to be compressed, a compression rate to be achieved, a quality of the decompressed video, one or more predetermined parameters, or the like, or a combination thereof. The numbers of frames of GOPs of a video may be a fixed value or variable values. For example, GOP #1 and GOP #2 may include a same number of frames or different numbers of frames.

The decoding of the video data 1220 may be performed in cycles (GOP cycles). During a GOP cycle, video frames of a current GOP (e.g., GOP #1) may be decoded sequentially. For example, the first frame, or the I-frame (e.g., $I_1$), of the GOP may be decoded (by the video player) firstly based on its own data to generate a first image (or picture) of the current GOP. The second frame, or the first P-frame (e.g., $P_{1,1}$), of the GOP may then be decoded based on its own data and the decoded I-frame to generate a second image. Next, the third frame, or the second P-frame (e.g., $P_{1,2}$), may be decoded based on its own data and the decoded first P-frame to generate a third image, and so on, until the last frame (e.g., $P_{1,3}$) of the current GOP is decoded. Then a next GOP cycle may be performed to decode video frames of a next GOP (e.g., GOP #2), and so on.

FIGS. 13 and 14 are schematic diagrams illustrating adding an I-frame into a queue according to some embodiments of the present disclosure. The adding and labelling of the I-frame may be performed by the processing module 903. As the I-frame is an independently decodable video frame which does not need any other video frames to assist its decoding, the processing module 903 may label the I-frame directly with the initial level determined by the first determination module 901 and add the I-frame into the queue without changing the levels of preceding video frames.

As illustrated in FIG. 13, the processing module 903 may add a high-level I-frame (e.g., level 2 I-frame 1320) into a queue 1310 ending with a low-level frame (e.g., level 1 P-frame 1311) to obtain a queue 1330. The insertion of the high-level I-frame may not affect the levels of the frames originally in the queue 1310.

As illustrated in FIG. 14, the processing module 903 may add a low-level I-frame (e.g., level 1 I-frame 1320) into a queue 1410 ending with one or more high-level frames (e.g., level 2 P-frame 1411) to obtain a queue 1430. The insertion of the low-level I-frame may also not affect the levels of the frames originally in the queue 1310.

The processing module 903 may also add a P-frame into the queue and label the P-frame with the initial value determined by the first determination module 901. For video frames belonging to the same GOP as the P-frame with levels (priority level) lower than the initial level of the P-frame in the queue, the processing module 903 may obtain these video frames and change their levels to the initial level of the P-frame. For instance, before the high-level P-frame is added (or inserted) into the queue, starting from the tail of the queue, the processing module 903 may change the levels of the low-level video frames sequentially, and the labeling (e.g., the changing of the levels of the video frames) may be performed until any one of the conditions illustrated by FIGS. 15 to 17 is met.

FIG. 15 is a schematic diagram illustrating a labeling of video frames until the head of the queue is reached according to some embodiments of the present disclosure. The processing module 903 may add a high-level P-frame 1520 into a queue 1510 including six level 1 P-frames (P-1 frames). The initial level of the high-level P-frame 1520 (P-2 frame) may be level 2. Before the high-level P-frame 1520 is added into the queue 1510, starting from the tail (tail frame 1513) of the queue 1510, the processing module 903 may change the levels of the level 1 frames into level 2 sequentially, and the labeling may be performed until the head (head frame 1512) of the queue 1510 is reached. The processing module 903 may then add the high-level P-frame 1520 into the queue 1510 (at the end) to obtain a queue 1530. The queue 1530 may consist of seven P-2 frames.

FIG. 16 is a schematic diagram illustrating a labeling of video frames until an I-frame of the same GOP is reached according to some embodiments of the present disclosure. The processing module 903 may add a high-level P-frame 1620 into a queue 1610 including five level 1 P-frames (P-1 frames) and a level 1 I-frame (I-1 frame 1612). The initial level of the high-level P-frame 1620 (P-2 frame) may be level 2. Starting from the head (head frame 1611) of the queue 1610, the arrangement sequence of the video frames is P-1 frame, P-1 frame, I-1 frame, P-1 frame, P-1 frame, P-1 frame. Before the high-level P-frame 1620 is added into the queue 1610, starting from the tail (tail frame 1613) of the queue, the processing module 903 may change the levels of the level 1 frames into level 2 sequentially, and the labeling may be performed until the I-frame 1612 is reached (and labeled). The processing module 903 may then add the high-level P-frame 1620 into the queue 1610 (at the end) to obtain a queue 1630. Starting from the head (head frame 1631) of the queue 1630, the arrangement sequence of the video frames may be P-1 frame, P-1 frame, I-2 frame, P-2 frame, P-2 frame, P-2 frame, P-2 frame.

FIG. 17 is a schematic diagram illustrating a labeling of video frames until a frame with a level higher than the initial level of the current video frame in the queue is reached according to some embodiments of the present disclosure. The processing module 903 may add a high-level P-frame 1720 into a queue 1710 including two level 2 P-frames (P-2 frames) and four level 0 P-frames (P-0 frames). The initial level of the high-level P-frame 1720 (P-1 frame) may be level 1. Starting from the head (head frame 1711) of the queue 1710, the arrangement sequence of the video frames is P-2 frame, P-2 frame, P-0 frame, P-0 frame, P-0 frame, P-0 frame. Before the high-level P-frame 1720 is added into the queue 1710, starting from the tail (tail frame 1713) of the queue, the processing module 903 may change the levels of the level 0 frames into level 1 sequentially, and the labeling may be performed until a video frame with a level higher than the initial level of the current video frame is reached, that is, until a P-2 frame 1712 is reached (which is not labeled). The processing module 903 may then add the high-level P-frame 1720 into the queue 1710 (at the end) to obtain a queue 1730. Starting from the head (head frame 1731) of the queue 1730, the arrangement sequence of the video frames may be P-2 frame, P-2 frame, P-1 frame, P-1 frame, P-1 frame, P-1 frame, P-1 frame.

FIG. 18 is a schematic diagram illustrating a method and process of video frame processing according to some embodiments of the present disclosure. Process 1800 is an embodiment of process 1100 illustrated in FIG. 11. One or more steps of process 1800 may be performed by the components of the video processing system 100. In some embodiments, one or more operations of process 1800 may be performed by the computing device 200 (illustrated in FIG. 2) implementing related functions of the video processing system 100. For example, process 1800 may be stored in the storage 220 in the form of instructions, and invoked and/or executed by the processor 210.

Let the total space size of the video frame buffering queue be max_buffer_size, the total size of the video frame data buffered in the current video frame buffering queue be busy_buffer_size, the ratio of the video frame size buffered by the current video frame buffering queue to the total buffer space size be busy_buffer_ratio, the current congestion level be congest_level, the maximum discarding level in the video frame buffering queue be max_drop_level, the current real-time encoded video frame be cur_frame, and the video frame obtained from the video frame buffering queue be peek_frame.

As shown in FIG. 18, the method may include:

Step 1801: an encoder (e.g., the encoder 121) may generate a video frame, which is denoted as cur_frame. Step 1801 may be an embodiment of step 410 of process 400 illustrated in FIG. 4. The encoder may generate the video frame using a technique well known in the art (e.g., using MPEG based compression techniques). Alternatively or additionally, the encoder may generate the video frame (the independently decodable ones) using a technique described in FIG. 20.

Step 1802: an event detection unit (e.g., included in the first determination module 901) may perform a detection on cur_frame. The event detection unit (or the first determination module 901) may extract features form the image represented by the cur_frame and analyze the extracted features to perform the detection. The image may be obtained directly from the encoder or be reconstructed based at least on the cur_frame (e.g., a decoded preceding frame may be required if the encoder use inter-frame decoding to generate the cur_frame). In some embodiments, the event detection unit may use a neural network to do the job.

Step 1803: determining whether cur_frame includes any specified event scene, such as whether a license plate number is detected, whether a vehicle over-line is detected. Upon determining at least one specified event scene, step 1804 may be executed; otherwise, step 1806 may be executed. Step 1803 may be performed by the first determination module 901. The first determination module 901 may perform the determination based on the result output by the event detection unit.

Step 1804: determining a level for each specified event scene included in cur_frame based on a pre-set level information of specified event scenes. For example, the detection of license plate number may be level 1, the car over-line may be level 2. The step 1804 may be performed by the determination module 901.

Step 1805: assigning a highest level of the at least one specified event scenes to max_event_level. For example, when the license plate number and the car over-line are detected at the same time, the highest level 2 may be assigned to max_event_level. Step 1807 may then be executed. Step 1805 may be performed by the first determination module 901.

Step 1806: assigning max_event_level to 0. Step 1807 may then be executed. The step 1806 may be performed by the first determination 901.

Step 1807: setting the level of cur_frame as max_event_level. The set level of cur_frame and max_event_level is the initial level of the current video frame referred to in other parts of the present disclosure. Step 1807 may be performed by the first determination module 901.

Step 1808: determining whether the current video frame cur_frame is an I-frame. If so, step 1809 may be executed; otherwise, step 1813 may be executed. Step 1808 may be performed by the first determination module 901.

Step 1809: obtaining (or determining) the current congestion level of the network congest_level. The determination may be performed by the first determination module 901. The first determination module 901 may determine the congestion level of the network based on the memory usage of the video frame buffering queue included in the buffer 123.

Step 1810: determining whether the congestion level congest_level is greater than 0. If so, step 1811 may be executed; otherwise, step 1819 may be executed. Step 1810 may be performed by the second determination module 902.

Step 1811: calculating the maximum discarding level in the video frame buffering queue max_drop_level, of which the value may be equal to congest_level minus 1. Step 1811 may be performed by the second determination module 902. It may be understood that, as the relationship between the congestion level and the degree of network congestion as well as the relationship between the level of a video frame and the specified event scene included in the video frame are both arbitrary set by the user, a mapping between max_drop_level and congest_level may be various in forms.

Step 1812: discarding (or removing) the video frames with levels lower than or equal to max_drop_level in the video frame buffering queue. Step 1819 may then be executed. Step 1812 may be performed by the processing module 903.

Step 1813: obtaining a tail frame from the video frame buffering queue and assigning it to peek_frame. Step 1813 may be performed by the processing module 903.

Step 1814: determining whether peek_frame is a blank video frame. If so, step 1819 may be executed; otherwise step 1815 may be executed. Step 1814 may be performed by the processing module 903. The blank video frame may refer to a video frame including no video content, let alone a specified event scene. The blank video frame may also refer to a video frame including video content but no specified event scene. It is obvious that the level of a blank video frame may be 0. The blank video frame may be directly added into the frame buffering queue without further analysis. In some embodiments, step 1814 may be skipped and step 1815 may be performed directly after step 1813 is performed.

Step 1815: determining whether the level of the video frame peek_frame is lower than the level of the current video frame cur_frame. If so, step 1816 may be executed; otherwise, step 1819 may be executed. Step 1815 may be performed by the processing module 903.

Step 1816: Assigning the level of the video frame peek_frame to max_event_level. Step 1816 may be performed by the processing module 903.

Step 1817: determining whether the video frame peek_frame is an I-frame. If so, step 1819 may be executed; otherwise, step 1818 may be executed. Step 1817 may be performed by the processing module 903.

Step 1818: Obtaining a preceding frame of peek_frame from the video frame buffering queue and assigning it to peek_frame. Step 1814 may then be executed. Step 1818 may be performed by the processing module 903. In some embodiments, instead of step 1814, step 1815 may be performed after step 1818 is performed. By repeating the cycle formed by steps 1818, 1814, 1815, 1816 and 1817 or the cycle formed by steps 1818, 1815, 1816 and 1817, all the video frames belonging to the same GOP as the current video frame cur_frame with levels lower than the initial level of the current video frame may have their levels set as the initial level of the current video frame.

Step 1819: Adding (or appending) the current video frame cur_frame to the tail of the video frame buffering queue. Step 1819 may be performed by the processing module 903. After step 1819 is performed, the video processing system 100 may repeat the video frame processing cycle illustrated by process 1800.

Figure 19:
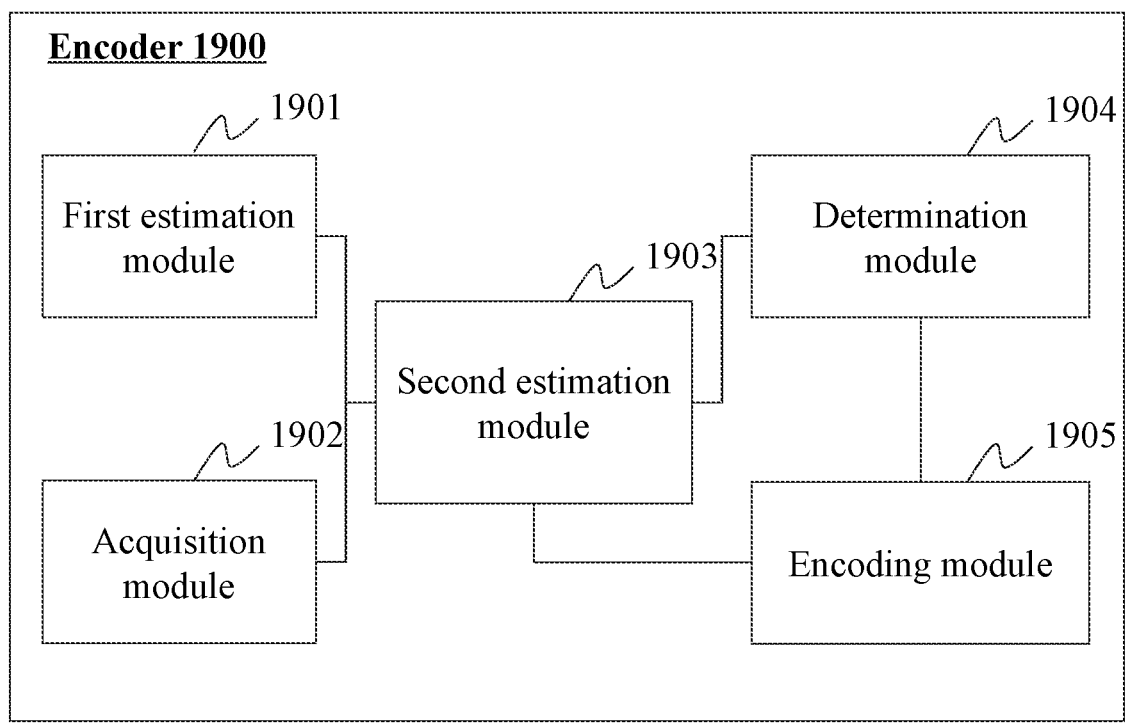
FIG. 19 is a schematic diagram illustrating an exemplary encoder according to some embodiment of the present disclosure.

FIG. 19 is a schematic diagram illustrating an exemplary encoder according to some embodiment of the present disclosure. Encoder 1900 may be an embodiment of the encoder 121. The encoder 1900 may be a device for encoding video frames and controlling sizes of the encoded video frames (e.g., I-frames) and may perform process 2000 as illustrated in FIG. 20. As shown in FIG. 19, the encoder 1900 may include:

A first estimation module 1901, being configured to estimate (or determine) a complexity of an I-frame to be encoded (a candidate video frame). The first estimation module 1901 may obtain the candidate video frame from a video (or a plurality of video frames) generated by the camera 111 or stored in the media server 112. The first estimation module 1901 may use various techniques well known in the art to determine the complexity of the candidate video frame. In some embodiments, the first estimation module 1901 may estimate the complexity of the candidate video frame based on a complexity of an encoded frame (or complexities of a plurality of encoded frames);

An acquisition module 1902, being configured to obtain a first quantization parameter for performing the encoding;

A second estimation module 1903, being configured to estimate (or determine) whether a first encoded size of the candidate video frame exceeds a predetermined threshold based on the complexity of the candidate video frame and the first quantization parameter.

A determination module 1904, being configured to determine a second quantization parameter when the first encoded size exceeds the predetermined threshold; wherein a second encoded size of the candidate video frame based on the second quantization parameter is lower than or equal to the predetermined threshold;

An encoding module 1905, being configured to encode the candidate video frame based on the second quantization parameter. The encoding module 1905 may send the encoded candidate video frame to the buffer 123 through the buffer manager 122. The encoded candidate video frame may be added into a queue stored in the buffer 123 and wait to be transmitted through the network 140.

In some embodiments, the first estimation module 1901 may be configured to estimate (or determine) the complexity of the candidate I-frame based on complexities of one or more preceding frames.

In some embodiments, the first estimation module 1901 may be configured to estimate (or determine) a sum of absolute deviation (SAD) of the I-frame based on an SAD of the encoded frame.

The second estimation module 1902 may be configured to estimate (or determine) whether the first encoded size of the I-frame exceeds the predetermined threshold based on the SAD of the I-frame and the first quantization parameter.

In some embodiments, the encoding module 1905 may also be configured to encode the I-frame based on the first quantization parameter when the size of the I-frame (after the encoding) does not exceed the predetermined threshold.

In some embodiments, the predetermined threshold of the size of the I-frame is determined based on a network transmission rate and a maximum network transmission wait time.

It may be noted that, the above descriptions about the encoder 1900 are only for illustration purposes, and are not intended to limit the present disclosure. It is understandable that, after learning the major concept and the mechanism of the present disclosure, a person of ordinary skill in the art may alter the encoder 1900 in an uncreative manner. The alteration may include combining and/or splitting modules or sub-modules, adding or removing optional modules or sub-modules, etc. All such modifications are within the protection scope of the present disclosure.

Figure 20:
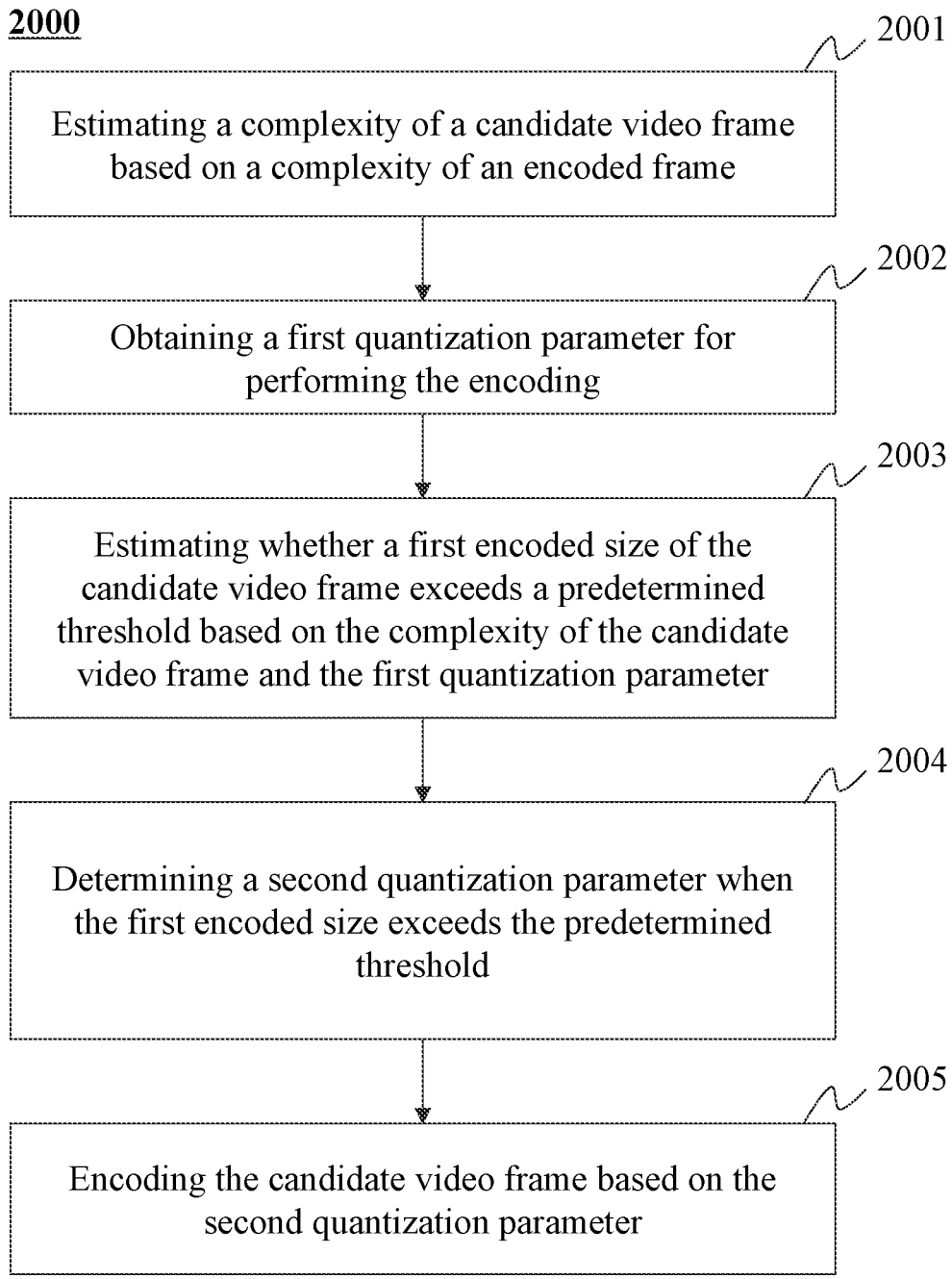
FIG. 20 is a schematic diagram illustrating a process for encoding and size controlling of an I-frame according to some embodiments of the present disclosure.

FIG. 20 is a schematic diagram illustrating a process for encoding and size controlling of an I-frame according to some embodiments of the present disclosure. Process 2000 may be included in step 410 of process 400 illustrated in FIG. 4. One or more steps of process 2000 may be performed by the encoder 1900. In some embodiments, one or more operations of process 2000 may be performed by the computing device 200 (illustrated in FIG. 2) implementing related functions of the encoder 121. For example, process 2000 may be stored in the storage 220 in the form of instructions, and invoked and/or executed by the processor 210. Process 2000 may include the following steps:

Step 2001: estimating (or determining) the complexity of a candidate video frame (e.g., an I-frame to be encoded). The encoder 121 may obtain the candidate video frame from a video (or a plurality of video frames) generated by the camera 111 or stored in the media server 112. The estimating of the complexity may be based on the complexity of an encoded frame. Step 101 may be performed by the first estimation module 1901. It is understood that, the first estimation module 1901 may also use other techniques to determine the complexity of the candidate video frame. In the above step 2001, according to some embodiments, the estimating the complexity of the candidate video frame may be performed based on complexities of one or more preceding frames.

In some embodiments, the complexity may be characterized by a sum of absolute differences (SAD), that is, an SAD of the candidate video frame may be estimated (or determined) based on an SAD of an encoded frame. The estimation may be performed by the first estimation module 901.

For example, the SAD of the candidate video frame may be estimated (or determined) based on the SAD of the preceding frame according to a mathematical relationship as illustrated by equation (1):

$$SAD_{cur}=a*SAD_{pre}+b, \qquad (1)$$

wherein, $SAD_{cur}$ may represent the complexity of the candidate video frame, $SAD_{pre}$ may represent the complexity of the preceding frame, a and b may each represent an empirical coefficient. The empirical coefficients may be obtained (e.g., by the first estimation module 1901) through a previous statistics of SADs of a certain number of video frames. The value of a and b may then be obtained (e.g., by the first estimation module 1901) by fitting.

In some embodiments, based on statistics of SADs of I-frames with certain data or statistics of SADs of a certain number of I-frames, a mapping relationship between the SAD of the I-frame and an SAD of a preceding I-frame may also be determined. During the estimation of the SAD of the candidate video frame, the SAD of the candidate video frame may be determined based on the SAD of the preceding I-frame and the mapping relationship obtained by the statistics.

Step 2002: obtaining a first quantization parameter for performing the encoding. The step 2002 may be performed by the acquisition module 1902. The first quantization parameter may be a default quantization parameter (e.g., pre-set by a manufacture of the encoder 1900), a last-used quantization parameter (e.g., for encoding a preceding video), a pre-determined quantization parameter (e.g., by one or more modules of the encoder 1900), a user-designated quantization parameter (e.g., by inputting or selecting through an interface for controlling the encoder 122), or the like, or a combination thereof.

The size of a video frame after encoding (e.g., the first encoded size, the second encoded size) may relate to parameters selected by an encoder (e.g., the encoder 121) during the encoding process. These parameters may include a mode, motion information, a quantization parameter (QP), and the like. Selecting different parameters may affect the encoding bit rate of a final video (encoded video). In these parameters, the QP may controls the amount of data loss during the lossy quantization process and may have a direct effect on the size of the encoded frame. A smaller quantization parameter may guarantee more bits for image encoding (or video encoding), and may provide more spatial details during the video reconstruction as far as possible; a larger quantization parameter may ensure that the output data rate (or bit rate) will not exceed a limitation of the buffer (e.g., buffer 123), but may augment the distortion after the video reconstruction. When other encoding parameters are fixed, the value of quantization parameter may directly decide the video quality and the frame size of the encoded video frame.

In some embodiments, a data rate control module is usually used to obtain a quantization parameter for the current encoding frame. The data rate control module may output the quantization parameter of the current candidate video frame based on an input target bit rate (e.g., input by a user) and a size of a buffer for reference decoding (sometimes the limitation of the buffer for reference decoding may not be needed).

Step 2003: estimating (or determining) whether a first encoded size of the candidate video frame (the I-frame to be encoded) exceeds a predetermined threshold based on the complexity of the I-frame and the first quantization parameter. The step 2003 may be performed by the second estimation module 1903.

In some embodiments, when SAD is used (e.g., by the second estimation module 1903) for characterizing the complexity, in the above step, the estimating (or determining) whether the first encoded size of the I-frame exceeds the predetermined threshold may be performed based on the SAD of the I-frame and the first quantization parameter.

A training may be performed (e.g., by the second estimation module 1903) in advance upon a certain number of samples with a support vector machine (SVM) to determine a kernel function for estimating whether the first encoded size of the I-frame exceeds the predetermined threshold. For example, encoding data of a large number of I-frames may be collected (e.g., by the second estimating module 1903), which may include the sizes of the I-frames, the complexities of the I-frame, and quantization parameters. Then the training may be performed upon the collected data with the SVM, wherein the adopted kernel function may be a linear kernel function as illustrated by equation (2):

$$Svm\_res = qp\_w * qp\_scale * (qp + qp\_shift) + sr\_w * sr\_scale * (sad + sr\_shift) + bias, \quad (2)$$

Wherein, sad may represent SAD, qp may represents quantization parameter, qp_w, qp_scale, qp_shift, sr_w, sr_scale, sr_shift and bias may represent empirical coefficients.

Through training, values of the empirical coefficients the kernel function illustrated by equation (2) may be determined (e.g., by the second estimation module 1903). After the kernel function illustrated by equation (2) is determined, a classifier for estimating whether the size of the I-frame after the encoding will exceed a predetermined threshold is obtained.

In some embodiments, in the above step 2003, the SAD of the I-frame and the first quantization parameter may be input into the equation (2) (or an SVM with the kernel function set as equation (2)). If Svm_res>0, it is assumed that the first encoded size of the I-frame exceeds the predetermined threshold; otherwise, the first encoded size of the I-frame does not exceed the predetermined threshold. In some embodiments, the determination may be based on the binarized Svm_res.

In some embodiments, the predetermined threshold may be determined (e.g., by the second estimation module 1903) based on a network transmission rate and a maximum network transmission wait time. In a monitoring system or a video processing system (e.g., the video processing system 100), usually a bit stream generated by a front-end camera (e.g., the camera 111 including the encoder 121) may be transmitted (e.g., the transmitter 124) through a network (e.g., the network 140) to a terminal or receiver (e.g., the network storage device 150, the terminal 130). As the transmission is through the network, the receiver may need to consider the factor of network latency. Assuming that the upper limit of the network transmission wait time of each frame of the video bit stream set by the receiver is k seconds (that is, a fact that a complete frame of the video bit stream has not been received over this time may be treated as an anomaly, such as data loss), as the network latency may need to be taken into consideration, this time upper limit value may not be set (e.g., by the terminal 130) with a too large value. If a video frame has relatively large data, and its time cost for a network transmission exceeds the upper limit k seconds of the network generation wait time, the network transmission of the data of this video frame may be considered (e.g., by the receiver) as abnormal. Assuming that the size of the video frame is M bits, and the network transmission rate is v bits/s, then the time cost of the network transmission of this video frame may be M/v seconds. If k<M/v, then the required network transmission time may exceed the upper limit of the network transmission wait time, which may cause the correct data being treated as a network transmission anomaly. An embodiment of the present disclosure may provide a solvation to the above problem by controlling the size of the I-frames (which are usually the video frames with larger sizes) so that M<=v*k. According to some embodiments, the predetermined threshold of the size of I-frames may be set to the network transmission rate multiplied by the network transmission wait time (v*k) bits.

Since data of an I-frame is much larger than data of other frames, the size estimation and control may only be performed (e.g., by the encoder 121) on the data of the I-frames. It may be understood that, the embodiment of the present disclosure is not limiting. Based on a technical concept similar to the embodiment of the present disclosure, a size estimation and control may also be performed on other video frames, such as P-frames.

Step 2004: determining a second quantization parameter when the first encoded size exceeds the predetermined threshold. The step 104 may be performed by the determination module 1904.

In the above step, the second quantization parameter may be determined so that the size of the I-frame after the encoding will be lower than or equal to the predetermined threshold.

In the case of the linear kernel function determined above (e.g., as illustrated by equation (2)), when it is estimated (e.g., by the second estimation module 1903) that the first encoded size of the I-frame exceeds the predetermined threshold, that is, when Svm_res>0, then in equation (2), let Svm_res=0, it may be obtained that:

$$qp = -((sr\_w * sr\_scale * (sad + sr\_shift)) + bias) / (qp\_w * qp\_scale) - qp\_shift. \quad (3)$$

Let $$fixed\_x1 = -((sr\_w * sr\_scale * sr\_shifter) + bias) / (qp\_w * qp\_scale),$$

and $$x2 = -(sr\_w * sr\_scale) / (qp\_w * qp\_scale),$$

it may be obtained that:

$$qp = x2*sad + \text{fixed}\_x1 - qp\_\text{shift}. \quad (4)$$

The quantization parameter determined according to the equation (4) can be used (e.g., by the encoder 121) as the second quantization parameter in the subsequent encoding process, so that the size (first encoded size) of the subsequent encoded I-frame is lower than or equal to the predetermined threshold. However, the second quantization parameter is not limited to the value calculated according to the equation (4), and may also be any other value (e.g., 1.05*qp, 1.1*qp, 1.2*qp, 1.5*qp, 2*qp, 3*qp, a predetermined value,) satisfying Svm_res≤0. For example, a look-up table expressing a mapping relationship between SADs and quantization parameters may be used (e.g., by the encoder 121) for determining the second quantization parameter (during which an interpolation or extrapolation may be involved). Alternatively, if the size of the I-frame size is estimated (or determined) using other algorithms in the above step 2003, the other algorithms may also be used correspondingly during the determination of the second quantization parameter in step 104.

Step 2005: encoding the candidate video frame (the I-frame to be encoded) based on the second quantization parameter, wherein, encoding the I-frame based on the second quantization may cause the size of the I-frame after the encoding (the second encoded size) being lower than or equal to the predetermined threshold value. The step 2005 may be performed by the encoding module 1905.

In some embodiments, if the size estimation result for the I-frame does not exceed the predetermined threshold (the first encoded size is estimated or determined as lower than or equal to the predetermined threshold), the I-frame may still be encoded based on the first quantization parameter.

The encoding module 1905 may send the encoded candidate video frame to the buffer 123 through the buffer manager 122. The encoded candidate video frame may be added into a queue stored in the buffer 123 and wait to be transmitted through the network 140.

An embodiment of process 2000 is provided and described in connection with FIG. 21 for better understanding.

It may be noted that the above descriptions of size controlling an I-frame size are only for demonstration purposes, and not intended to limit the scope of the present disclosure. It is understandable that, after learning the major concept and the mechanism of the present disclosure, a person of ordinary skill in the art may alter process 2000 in an uncreative manner. For example, the operations above may be implemented in an order different from that illustrated in FIG. 20. One or more optional operations may be added to the flowcharts. One or more operations may be divided or be combined. All such modifications are within the protection scope of the present disclosure.

Figure 21:
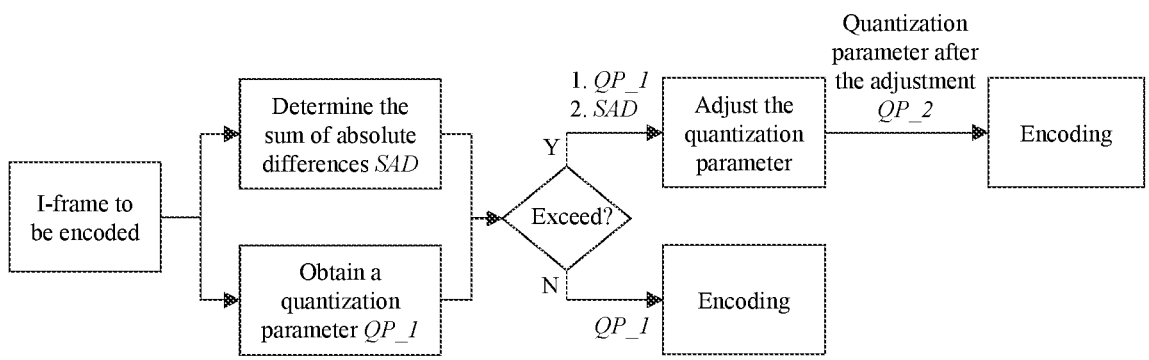
FIG. 21 is a schematic diagram illustrating a process for controlling a size of an I-frame according to some embodiments of the present disclosure.

FIG. 21 is a schematic diagram illustrating a process for controlling a size of an I-frame according to some embodiments of the present disclosure. Process 2100 is a detailed embodiment of process 2000. A brief description of process 2000 is provided as following:

Assuming that there is a linear relationship between an SAD of an I-frame and an SAD of a preceding frame, and the linear relationship may be the one as described in equation (1). Based on a large number of collected I-frame samples, a linear fitting may be performed (e.g., by the first estimation module 1903) to determine the empirical coefficients a and b. In a specific embodiment, the determined empirical coefficients may be: a=1, b=1. An equation (5) may then be obtained as:

$$SAD_{cur} = SAD_{pre}. \quad (5)$$

The above equation may indicate that the SAD of the current I-frame is (precisely or approximately) equal to the SAD of the preceding frame.

Based on the network transmission rate and the network transmission wait time, a predetermined threshold for estimating the size of I-frame may be determined (e.g., by the second estimation module 1903) as 300 kbits. Based on the predetermined threshold, a training using an SVM may be performed (e.g., by the second estimation module 1903) upon the large number of I-frame samples, during which, the encoding data of the I-frames may be collected including: sizes of I-frames, SADs of I-frames and quantization parameters of I-frames. For determining the empirical coefficients in equation (2), the I-frames with sizes larger than 300 kbits may be used as positive samples, that is, Svm_res=1 in equation (2); the I-frame with sizes lower than or equal to 300 kbits may be used as negative samples, that is, Svm_res=0 in equation (2). In a specific embodiment, the empirical coefficients may be determined as sr_w=−5.5082, sr_shift=−0.0804, sr_scale=19.6308, bias=9.5505, qp_w=8.6304, qp_shift=−0.2903, qp_scale=14.5165, and the equation (6) may be obtained as:

$$Svm\_res = 125.2832016*(qp-0.2903) + 108.13037256*(sad-0.0804) + 9.5505 \quad (6)$$

During the estimation of the SAD of the current I-frame to be encoded (candidate video frame), $SAD_{pre}$ of a preceding frame of the current I-frame may be input into equation (5) to obtain $SAD_{cur}$ of the current I-frame. Then $SAD_{cur}$ of the current I-frame and a first quantization parameter qp_1 used for the current encoding may be input into equation (6) (or an SVM with its kernel function set as equation (6)) for calculating Svm_res (e.g., binarized using a rounding technique). If Svm_res=0, the size of the I-frame after encoding (first encoded size) may be assumed not to exceed 300 kbits, so the encoding may be performed based on the first quantization parameter qp_1. If Svm_res=1, the size of the I-frame after encoding may be assumed to exceed 300 kbits, then by letting the right side of the equation be 0 and inputting $SAD_{cur}$ of the current I-frame, qp may be solved reversely as the second quantization parameter qp_2. Then the encoding may be performed based on the second parameter qp_2.

In the above embodiment of the present disclosure, the complexity of the I-frame to be encoded (candidate I-frame) may be estimated or determined (e.g., by the first estimation module 1901), and the first quantization parameter for encoding may be obtained (e.g., by the acquisition module 1902). Based on the complexity and the first quantization parameter, an estimation that whether the size of the I-frame after the encoding (the first encoded size) exceeds a predetermined threshold may be performed (e.g., by the second estimation module 1903). If the estimation result indicating that the first encoded size exceeds the predetermined threshold, the second quantization parameter may be determined (e.g., by the determination module 1904), and the encoding may be performed (e.g., by the encoding module 1905) based on the second quantization parameter, causing the size of the encoded 1-frame (the second encoded size) being equal to or lower than the predetermined threshold, so that an oversized-I-frame-caused anomaly problem which may further affect the video quality may be avoided.

Having thus described the basic concepts, it may be rather apparent to those skilled in the art after reading this detailed disclosure that the foregoing detailed disclosure may be intended to be presented by way of example only and may be not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment may be included in at least one embodiment of the present disclosure. Therefore, it may be emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that may be not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, may be not intended to limit the claimed processes and methods to any order except as may be specified in the claims. Although the above disclosure discusses through various examples what may be currently considered to be a variety of useful embodiments of the disclosure, it may be to be understood that such detail may be solely for that purposes, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purposes of streamlining the disclosure aiding in the understanding of one or more of the various inventive embodiments. This method of disclosure, however, may be not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being changed in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein may be hereby incorporated herein by this reference in its entirety for all purposes, excepting any prosecution file history associated with same, any of same that may be inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

What is claimed is:

1. A video processing system for encoding video streams, comprising:
    at least one camera configured to generate a plurality of video frames; and
    one or more video processing devices, configured to encode the plurality of video frames,
    wherein during operation, the one or more video processing devices:
        obtain a candidate video frame the plurality of video frames, wherein the candidate video frame is encoded as an independently decodable video frame;
        determine a complexity of the candidate video frame;
        obtain a first quantization parameter for performing the encoding; and
        determine whether a first encoded size of the candidate video frame exceeds a predetermined threshold based on the complexity of the candidate video frame and the first quantization parameter;
        when the first encoded size exceeds the predetermined threshold:
            determine a second quantization parameter, so that a second encoded size of the candidate video frame based on the second quantization parameter is lower than or equal to the predetermined threshold; and
        encode the candidate video frame based on the second quantization parameter, wherein the one or more video processing devices further:
        designate the encoded candidate video frame as a current video frame;
        determine a transmission performance of a network for a queue of video frames, each video frame in the queue associated with a priority level;
        determine a maximum discarding level based on the transmission performance of the network; and
        remove, from the queue, target video frames of which the associated priority level is lower than or equal to the maximum discarding level, wherein the priority level of each video frame in the queue is based at least on an interest level associated with a specified event scene included in that video frame, wherein the interest level represents a degree of attention to the specified event scene.

2. The video processing system of claim 1, wherein the complexity of the candidate video frame includes a sum of absolute differences (SAD) of the candidate video frame, and the complexity of the candidate video frame is determined based on a SAD of at least one preceding video frames.

3. The video processing system of claim 1, wherein the one or more video processing devices further:

encode the candidate video frame based on the first quantization parameter when the first encoded size is lower than or equal to the predetermined threshold.

4. The video processing system of claim 1, wherein the predetermined threshold is based on a network transmission rate and a maximum network transmission wait time.

5. A method configured to encode video streams via at least one video processing device, comprising:
    determining, by the at least one video processing device, a complexity of a candidate video frame, wherein the candidate video frame is encoded as an independently decodable video frame;
    obtaining, by the at least one video processing device, a first quantization parameter for performing the encoding; and
    determining, by the at least one video processing device, whether a first encoded size of the candidate video frame exceeds a predetermined threshold based on the complexity of the candidate video frame and the first quantization parameter;
    when the first encoded size exceeds the predetermined threshold:
        determining, by the at least one video processing device, a second quantization parameter, so that a second encoded size of the candidate video frame based on the second quantization parameter is lower than or equal to the predetermined threshold; and
    encoding, by the at least one video processing device, the candidate video frame based on the second quantization parameter, wherein the method further comprise:
        designating the encoded candidate video frame as a current video frame;
        determining a transmission performance of a network for a queue of video frames, each video frame in the queue associated with a priority level;
        determining a maximum discarding level based on the transmission performance of the network; and
        removing, from the queue, target video frames of which the associated priority level is lower than or equal to the maximum discarding level, wherein the priority level of each video frame in the queue is based at least on an interest level associated with a specified event scene included in that video frame, and the interest level represents a degree of attention to the specified event scene.

6. The method of claim 5, wherein the complexity of the candidate video frame includes a sum of absolute differences (SAD) of the candidate video frame, and the complexity of the candidate video frame is determined based on a SAD of at least one preceding video frames.

7. The method of claim 5, further comprising:
    encoding the candidate video frame based on the first quantization parameter when the first encoded size is lower than or equal to the predetermined threshold.

8. The method of claim 5, wherein the predetermined threshold is based on a network transmission rate and a maximum network transmission wait time.

9. A non-transitory computer readable medium, storing instructions, the instructions when executed by a processor, causing the processor to execute operations comprising:
    determining a complexity of a candidate video frame, wherein the candidate video frame is encoded as an independently decodable video frame;
    obtaining a first quantization parameter for performing the encoding;
    determining whether a first encoded size of the candidate video frame exceeds a predetermined threshold based on the complexity of the candidate video frame and the first quantization parameter;

when the first encoded size exceeds the predetermined threshold:
- determining a second quantization parameter, so that a second encoded size of the candidate video frame based on the second quantization parameter is lower than or equal to the predetermined threshold; and
- encoding the candidate video frame based on the second quantization parameter, wherein the operations further comprise:
- designating the encoded candidate video frame as a current video frame;
- determining a transmission performance of a network for a queue of video frames, each video frame in the queue associated with a priority level;
- determining a maximum discarding level based on the transmission performance of the network; and
- removing, from the queue, target video frames of which the associated priority level is lower than or equal to the maximum discarding level, wherein the priority level of each video frame in the queue is based at least on an interest level associated with a specified event scene included in that video frame, and the interest level represents a degree of attention to the specified event scene.

10. The non-transitory computer readable medium of claim 9, wherein the complexity of the candidate video frame includes a sum of absolute differences (SAD) of the candidate video frame, and the complexity of the candidate video frame is determined based on a SAD of at least one preceding video frames.

11. The non-transitory computer readable medium of claim 9, further comprising:
- encoding the candidate video frame based on the first quantization parameter when the first encoded size is lower than or equal to the predetermined threshold.

12. The non-transitory computer readable medium of claim 9, wherein the predetermined threshold is based on a network transmission rate and a maximum network transmission wait time.

13. The non-transitory computer readable medium of claim 9, wherein the candidate video frame is encoded as an independently decodable video frame.

14. The non-transitory computer readable medium of claim 13, further comprising:
- designating the encoded candidate video frame as a current video frame;
- determining a transmission performance of a network for a queue of video frames, each video frame in the queue associated with a priority level;
- determining a maximum discarding level based on the transmission performance of the network; and
- removing, from the queue, target video frames of which the associated priority level is lower than or equal to the maximum discarding level.

* * * * *